(12) United States Patent
Hallock et al.

(10) Patent No.: US 11,850,732 B2
(45) Date of Patent: Dec. 26, 2023

(54) UNDER-ACTUATED ROBOTIC MANIPULATORS

(71) Applicant: Ocado Innovation Limited, Hatfield (GB)

(72) Inventors: David Gabriel Hallock, San Francisco, CA (US); Thomas John Hummel, San Mateo, CA (US); Bryan Whittington, San Francisco, CA (US); Nicholas Keyes, Saratoga, CA (US)

(73) Assignee: OCADO INNOVATION LIMITED, Hatfield (GB)

( * ) Notice: Subject to any disclaimer, the term of this patent is extended or adjusted under 35 U.S.C. 154(b) by 794 days.

(21) Appl. No.: 16/681,667

(22) Filed: Nov. 12, 2019

(65) Prior Publication Data

US 2020/0164523 A1 May 28, 2020

Related U.S. Application Data

(60) Provisional application No. 62/771,917, filed on Nov. 27, 2018.

(51) Int. Cl.
*B25J 15/00* (2006.01)
*B25J 9/10* (2006.01)
*B25J 17/02* (2006.01)
*B25J 9/06* (2006.01)

(52) U.S. Cl.
CPC ............ *B25J 15/0009* (2013.01); *B25J 9/06* (2013.01); *B25J 9/1065* (2013.01); *B25J 17/025* (2013.01)

(58) Field of Classification Search
CPC .. B25J 15/0009; B25J 15/022; B25J 15/0253; B25J 15/0266; B25J 15/08
See application file for complete search history.

(56) References Cited

U.S. PATENT DOCUMENTS

| | | | |
|---|---|---|---|
| 6,913,627 B2* | 7/2005 | Matsuda | B25J 9/104 623/64 |
| 8,388,035 B2* | 3/2013 | Kamon | B25J 15/0266 294/213 |
| 9,539,728 B2* | 1/2017 | Nammoto | B25J 15/0009 |
| 9,844,885 B2* | 12/2017 | Wong | B25J 15/10 |
| 2004/0058765 A1* | 3/2004 | Kubein-Meesenburg | B25J 15/0009 474/206 |

* cited by examiner

*Primary Examiner* — Bobby Rushing, Jr.
(74) *Attorney, Agent, or Firm* — Seed IP Law Group LLP

(57) ABSTRACT

Underactuated robotic manipulators may include a plurality of links rotatably or rigidly coupled to one another at a plurality of joints. The links may include driven links that are driven to grasp an object to be held, driving links that are actuated by an actuator to drive movement of the driven links, and a plurality of connecting links that couple the driving links to the driven links. Such manipulators may include a plurality of driven links and associated touch points, and a plurality of independent degrees of freedom, and be driven by a single actuator, making them underactuated.

19 Claims, 12 Drawing Sheets

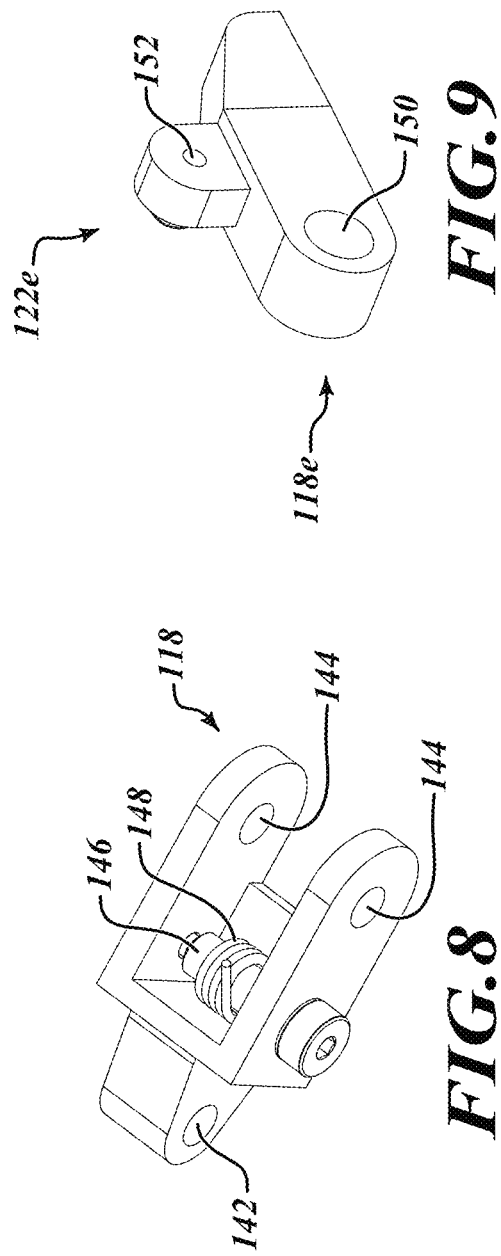

UNDER-ACTUATED ROBOTIC MANIPULATORS

BACKGROUND

Technical Field

The present disclosure relates generally to robotic manipulators, and more particularly to under-actuated robotic manipulators having plural joints controlled by a single actuator.

Description of the Related Art

Robotic end-of-arm tooling (EOAT) and robotic end effectors take many forms. Generally speaking, an end effector is a component at the terminal, distal end of a robotic arm and is configured to perform one or more of various actions, and may take the form of a gripper, a cutting tool, or other device. Robotic manipulators, which represent one type of robotic end effector, are generally configured to grasp or otherwise hold objects and move the objects in space. Robotic manipulators may be impactive robotic manipulators, which typically use jaws, fingers, or other similar mechanisms to grasp an object to be moved, such that the object is held by frictional forces. Robotic manipulators may also be astrictive robotic manipulators, which typically use vacuum, magnetic, or electrical devices, or other similar mechanisms, to grasp an object to be moved, such that the object is held by attractive forces such as suction, magnetism, or electroadhesion. An underactuated robotic system, as that terminology is used herein, is a robotic system that has more degrees of freedom than actuators.

There is a general need in the art for more effective robotic end effectors and robotic manipulators. Effectiveness may depend on a variety of factors. For example, an end effector capable of holding an object with greater force, or more securely, may be more effective. As another example, an end effector capable of holding an object with a reduced chance of damaging the object, and/or that is capable of holding a wider range of objects, may also be more effective. As one additional example, an end effector of simpler construction, that is simpler to actuate and use, and/or that is simpler to maintain or replace, may also be more effective.

BRIEF SUMMARY

In some embodiments, a robotic manipulator has fingers with multiple touch points that are coupled to one another by a set of linkages, where the touch points can conform to the shape of an object held by the robotic manipulator. The robotic manipulator may be under-actuated, which may assist in pick-and-place, gripping, sorting, and other operations, as well as in reducing the risk of damaging, crushing, or mishandling of objects. The robotic manipulator may be a robotic end-of-arm tooling ("EOAT") with fingers and/or grippers that are electrically, hydraulically, mechanically, or pneumatically powered. An object identification process may allow the robotic manipulator to adjust forces or pressures exerted by the touch points based on identified size, dimensions, weight, shape, or other characteristics of the object to be held. The robotic manipulator may also be controlled in part by recursive learning techniques. Over time, a system controlling the robotic manipulator may be adjusted and optimized based on learned characteristics of object characteristics, pressure and sensor feedback, object drop rates, object grasp rates, finger slippage, etc.

In operation, the robotic manipulator may position a pair of fingers around an identified object, and close the fingers on the object to grasp the object. As each touch point makes contact with a surface of the object, the under-actuation of the robotic manipulator allows the joints of the robotic manipulator to passively adjust the motion of the segments of the fingers, and/or the forces and/or pressures exerted by the segments of the fingers, as the fingers close on the object, such that the segments of the fingers ultimately more closely conform to the shape of the object. Thus, the under-actuation of the robotic manipulator allows the robotic manipulator to progressively envelope the object, and reduces the risk of crushing of the object.

An underactuated robotic manipulator may be summarized as comprising: a first driven link rotatable about a first joint, wherein the first driven link includes a first touch point configured to contact an object to be held by the underactuated robotic manipulator; a second driven link coupled to the first driven link and rotatable with respect to the first driven link about a second joint, wherein the second driven link includes a second touch point configured to contact the object to be held by the underactuated robotic manipulator; a first connecting link coupled to the first driven link and rotatable with respect to the first driven link; a second connecting link coupled to the second driven link and rotatable with respect to the second driven link; a first driving link coupled to the first connecting link and rotatable with respect to the first connecting link about a third joint; and a second driving link having a first end coupled to the first connecting link and the first driving link at the third joint and a second end coupled to the second connecting link and rotatable with respect to the second connecting link about a fourth joint.

The first driven link may be rotatably coupled to a base frame. The first driving link may be rotatably coupled to an actuator. The underactuated robotic manipulator may further comprise latticework that extends from the second driving link to the second driven link and from the first connecting link to the second connecting link. The first connecting link may be coupled to the first driven link at a fifth joint and rotatable with respect to the first driven link at the fifth joint. The fifth joint may be located at a midpoint of the first driven link. The second connecting link may be coupled to the second driven link at a fifth joint and rotatable with respect to the second driven link at the fifth joint. The fifth joint may be located at a midpoint of the second driven link. The first end of the second driving link may be rotatable with respect to the first connecting link and the first driving link at the third joint. The first connecting link may be coupled to the first driven link at the second joint and may be rotatable with respect to the first driven link about the second joint. The first end of the second driving link may be rigidly coupled to the first connecting link at the third joint. The first end of the second driving link may be rigidly coupled to the first driving link at the third joint.

An underactuated robotic manipulator may be summarized as comprising: a first driven link rotatable about a first joint, wherein the first driven link includes a first touch point configured to contact an object to be held by the underactuated robotic manipulator; a second driven link coupled to the first driven link and rotatable with respect to the first driven link about a second joint, wherein the second driven link includes a second touch point configured to contact the object to be held by the underactuated robotic manipulator; a first connecting link coupled to the first driven link and rotatable with respect to the first driven link; a second connecting link coupled to the second driven link and rotatable with respect to the second driven link; a first driving link coupled to the first connecting link and rotatable with respect to the first connecting link about a third joint; a second driving link having a first end coupled to the first connecting link and the first driving link at the third joint and a second end coupled to the second connecting link and rotatable with respect to the second connecting link about a fourth joint; a third driven link coupled to the second driven link and rotatable with respect to the second driven link about a fifth joint, wherein the third driven link includes a third touch point configured to contact the object to be held by the underactuated robotic manipulator; a third connecting link coupled to the third driven link and rotatable with respect to the third driven link; and a third driving link having a first end coupled to the second connecting link and the second driving link at the fourth joint and a second end coupled to the third connecting link and rotatable with respect to the third connecting link about a sixth joint.

The underactuated robotic manipulator may further comprise: a fourth driven link coupled to the third driven link and rotatable with respect to the third driven link about a seventh joint, wherein the fourth driven link includes a fourth touch point configured to contact the object to be held by the underactuated robotic manipulator; a fourth connecting link coupled to the fourth driven link and rotatable with respect to the fourth driven link; and a fourth driving link having a first end coupled to the third connecting link and the third driving link at the sixth joint and a second end coupled to the fourth connecting link and rotatable with respect to the fourth connecting link about an eighth joint.

An underactuated robotic manipulator may be summarized as comprising: a first driven link rotatable about a first joint, wherein the first driven link includes a first touch point configured to contact an object to be held by the underactuated robotic manipulator; a second driven link coupled to the first driven link and rotatable with respect to the first driven link about a second joint, wherein the second driven link includes a second touch point configured to contact the object to be held by the underactuated robotic manipulator; a first connecting link coupled to the first driven link and rotatable with respect to the first driven link; a second connecting link coupled to the second driven link and rotatable with respect to the second driven link; a first driving link coupled to the first connecting link and rotatable with respect to the first connecting link about a third joint; a second driving link having a first end coupled to the first connecting link and the first driving link at the third joint and a second end coupled to the second connecting link and rotatable with respect to the second connecting link about a fourth joint; a third driven link coupled to the second driven link and rotatable with respect to the second driven link about a fifth joint, wherein the third driven link includes a third touch point configured to contact the object to be held by the underactuated robotic manipulator; a third connecting link coupled to the third driven link and rotatable with respect to the third driven link; a third driving link having a first end coupled to the second connecting link and the second driving link at the fourth joint and a second end coupled to the third connecting link and rotatable with respect to the third connecting link about a sixth joint; a fourth driven link coupled to the third driven link and rotatable with respect to the third driven link about a seventh joint, wherein the fourth driven link includes a fourth touch point configured to contact the object to be held by the underactuated robotic manipulator; a fourth connecting link coupled to the fourth driven link and rotatable with respect to the fourth driven link; a fourth driving link having a first end coupled to the third connecting link and the third driving link at the sixth joint and a second end coupled to the fourth connecting link and rotatable with respect to the fourth connecting link about an eighth joint; a fifth driven link coupled to the fourth driven link and rotatable with respect to the fourth driven link about a ninth joint, wherein the fifth driven link includes a fifth touch point configured to contact the object to be held by the underactuated robotic manipulator; and a fifth driving link having a first end coupled to the fourth connecting link and the fourth driving link at the eighth joint.

The underactuated robotic manipulator may further comprise: a fifth connecting link rigidly coupled to the fifth driven link; wherein the fifth driving link has a second end rotatably coupled to the fifth connecting link. The fifth driving link may have a second end coupled to the fifth driven link at a tenth joint and rotatable with respect to the fifth driven link about the tenth joint. The underactuated robotic manipulator may further comprise: a fifth connecting link coupled to the fifth driven link at a tenth joint and rotatable with respect to the fifth driven link about the tenth joint; wherein the fifth driving link has a second end coupled to the fifth connecting link at an eleventh joint and rotatable with respect to the fifth connecting link about the eleventh joint. The underactuated robotic manipulator may further comprise: a sixth driven link coupled to the fifth driven link and rotatable with respect to the fifth driven link about the tenth joint, wherein the sixth driven link includes a sixth touch point configured to contact the object to be held by the underactuated robotic manipulator; and a sixth driving link having a first end coupled to the fifth connecting link and the fifth driving link at the eleventh joint. The sixth driving link may have a second end coupled to the sixth driven link at a twelfth joint and rotatable with respect to the sixth driven link about the twelfth joint.

BRIEF DESCRIPTION OF THE SEVERAL VIEWS OF THE DRAWINGS

FIG. 6 illustrates a perspective view of a driving link of the underactuated robotic manipulator of FIGS. 3-5 according to an embodiment of the present disclosure.

FIG. 7 illustrates a perspective view of a connecting link of the underactuated robotic manipulator of FIGS. 3-5 according to an embodiment of the present disclosure.

FIG. 8 illustrates a perspective view of a driven link of the underactuated robotic manipulator of FIGS. 3-5 according to an embodiment of the present disclosure.

FIG. 9 illustrates a perspective view of a distal driven link of the underactuated robotic manipulator of FIGS. 3-5 according to an embodiment of the present disclosure.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Figure 1:
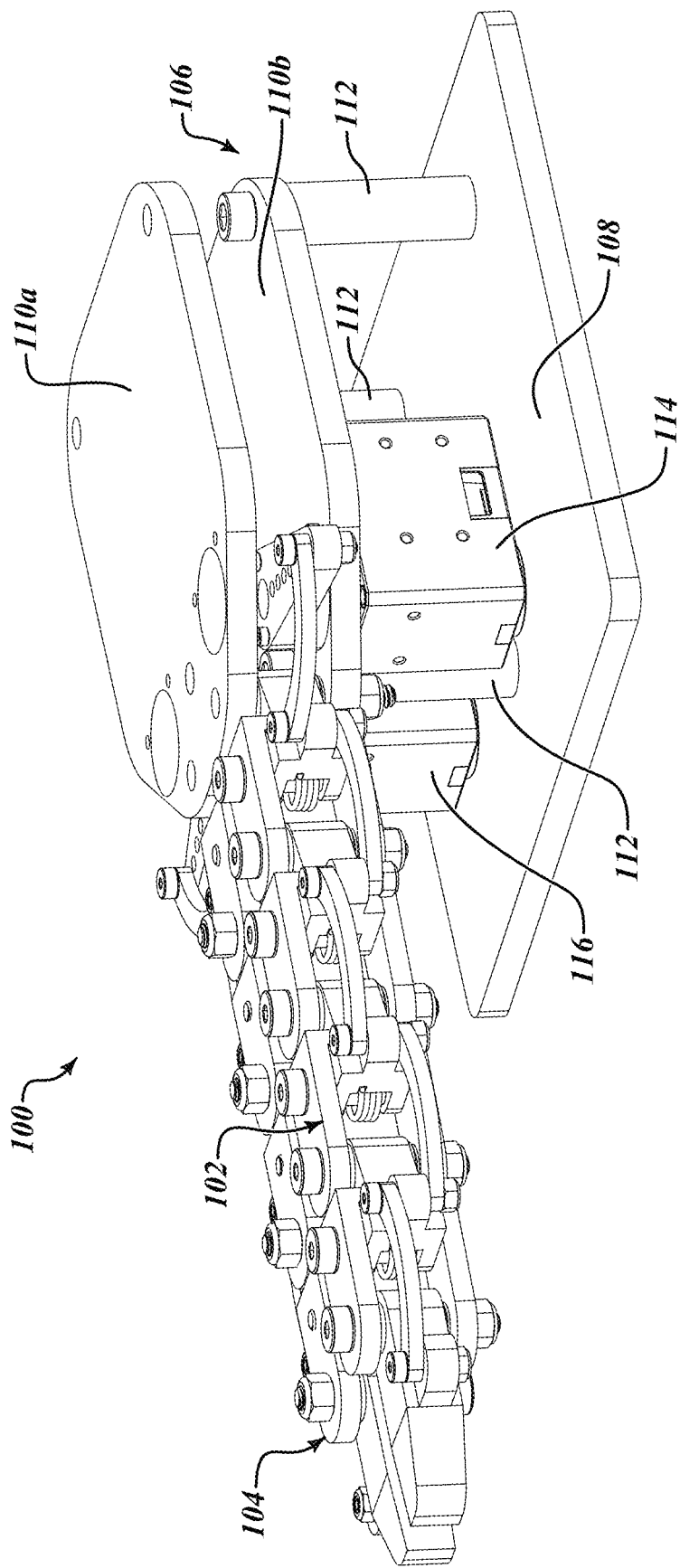
FIG. 1 illustrates a perspective view of a system including two underactuated robotic manipulators according to an embodiment of the present disclosure.

FIG. 1 illustrates a robotic system 100 including a first underactuated robotic manipulator 102 and a second underactuated robotic manipulator 104. As illustrated in FIG. 1, the robotic system 100 includes a base frame 106 to which the first and second underactuated robotic manipulators 102, 104 are mounted. For purposes of this disclosure, the base frame 106 can be considered stationary, although in practice the base frame 106 may be coupled to a robotic arm or other moving system such that the entire robotic system 100 can be moved around in space.

The base frame 106 includes a mounting plate 108, which may be configured to be mounted on another surface or device and securely couple the rest of the robotic system 100 to the other surface or device. The base frame 106 also includes a pair of support plates 110a and 110b, which may be spaced apart from one another such that proximal ends of the first and second underactuated robotic manipulators 102, 104 may be positioned between the plates 110a, 110b, and to which the proximal ends of the first and second underactuated robotic manipulators 102, 104 may be rotatably coupled. The base frame 106 also includes a plurality of support and separation columns 112 that rigidly couple the mounting plate 108 and support plates 110a, 110b to one another such that the plates 108, 110a, and 110b are substantially parallel to one another. The columns 112 maintain the separation between the plates 110a, 110b, as well as a separation between the mounting plate 108 and the support plates 110a, 110b.

As illustrated in FIG. 1, the robotic system 100 includes a first actuator 114 that is positioned between the mounting plate 108 and the support plates 110a, 110b, and that is configured to actuate the first underactuated robotic manipulator 102, and a second actuator 116 that is positioned between the mounting plate 108 and the support plates 110a, 110b, and that is configured to actuate the second underactuated robotic manipulator 104. The robotic system 100 may have exactly two, or only two actuators, namely, the first actuator 114 for actuating the first underactuated robotic manipulator 102 and only the first underactuated robotic manipulator 102, and the second actuator 116 for actuating the second underactuated robotic manipulator 104 and only the second underactuated robotic manipulator 104. Such an embodiment allows the first and second underactuated robotic manipulators 102, 104 to be actuated independently of one another. In other embodiments, the robotic system 100 may include only a single actuator that is configured to actuate both of the first and second underactuated robotic manipulators 102 and 104. The first and second actuators 114, 116 may be electrically-, hydraulically-, mechanically-, or electro-mechanically powered. In some embodiments, the output of the first actuator 114 may be either rotary or linear. In some embodiments, the output of the second actuator 116 may be either rotary or linear.

Figure 2:
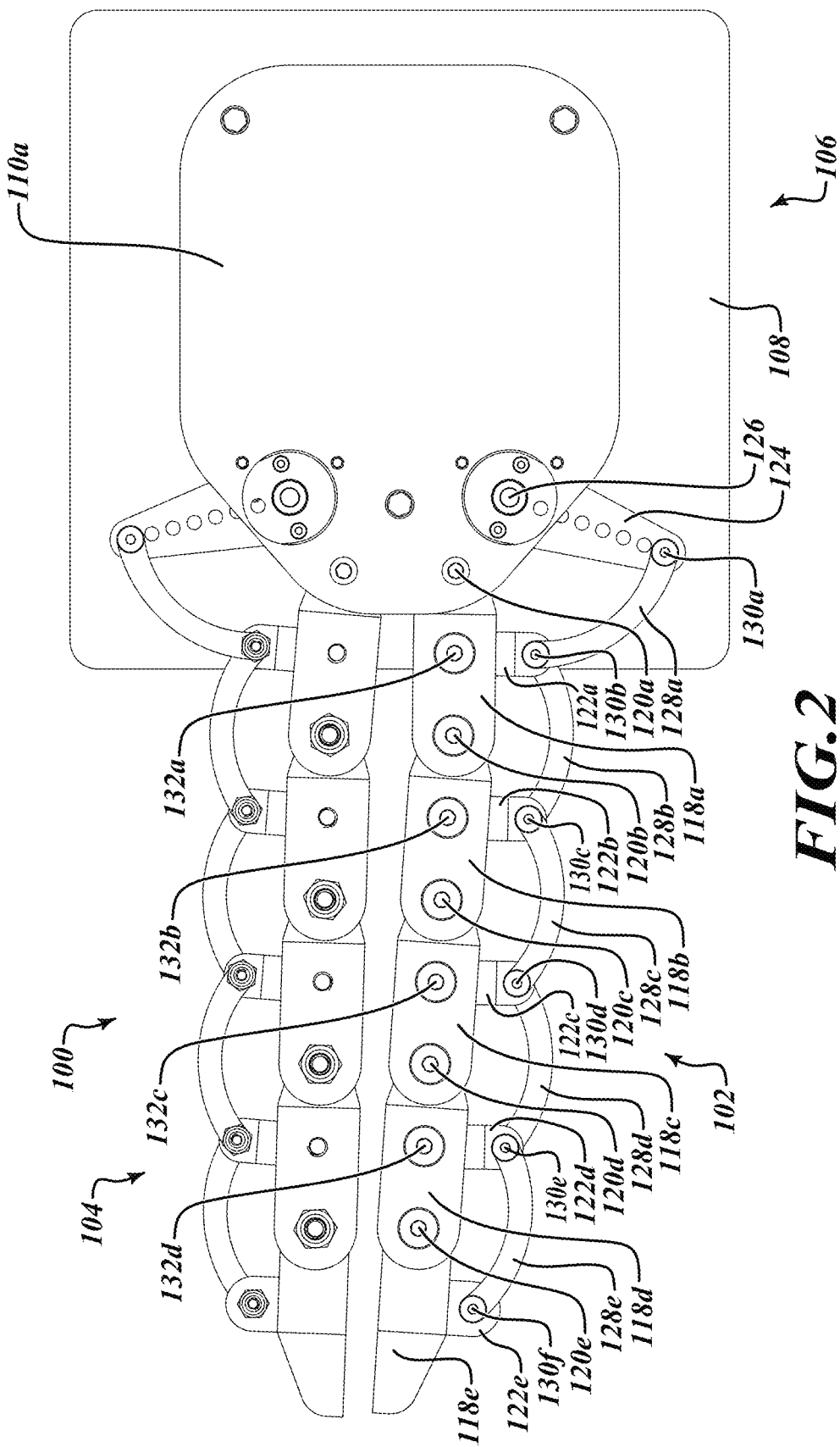
FIG. 2 illustrates a plan view of the system of FIG. 1 according to an embodiment of the present disclosure.

FIG. 2 illustrates a plan view of the robotic system 100. As illustrated in FIG. 2, the first underactuated robotic manipulator 102 includes a plurality of driven links 118 that collectively form an inner side of the underactuated robotic manipulator 102. As used herein, the terminology "inner side" of the underactuated robotic manipulator 102 means the side of the underactuated robotic manipulator 102 configured to contact an object to be grasped or otherwise held by the robotic system 100, which is typically a side of the underactuated robotic manipulator 102 toward which the underactuated robotic manipulator 102 bends as it is actuated and moves to contact the object. As the terminology is used herein, "links" are components coupled to one another to form a portion of a robotic manipulator. The links of the robotic system 100 may be rigid and may be made from a metal or a metal alloy, such as aluminum or steel.

In more detail, the first underactuated robotic manipulator 102 includes a first, proximal driven link 118a that is rotatably coupled to the base frame 106 and the first and second support plates 110a, 110b thereof at a first rotatable joint 120a, such that the entire inner side of the underactuated robotic manipulator 102 is rotatable about the first rotatable joint 120a. The first underactuated robotic manipulator 102 also includes a second driven link 118b that is rotatably coupled to the first, proximal driven link 118a at a second rotatable joint 120b, such that the entire inner side of the underactuated robotic manipulator 102 distal to the first, proximal driven link 118a is rotatable about the second rotatable joint 120b. The first underactuated robotic manipulator 102 also includes a third driven link 118c that is rotatably coupled to the second driven link 118b at a third rotatable joint 120c, such that the entire inner side of the underactuated robotic manipulator 102 distal to the second driven link 118b is rotatable about the third rotatable joint 120c. The first underactuated robotic manipulator 102 also includes a fourth driven link 118d that is rotatably coupled to the third driven link 118c at a fourth rotatable joint 120d, such that the entire inner side of the underactuated robotic manipulator 102 distal to the third driven link 118c is rotatable about the fourth rotatable joint 120d. The first underactuated robotic manipulator 102 also includes a fifth, distal driven link 118e that is rotatably coupled to the fourth driven link 118d at a fifth rotatable joint 120e, such that the fifth, distal driven link 118e is rotatable about the fifth rotatable joint 120e. While the first underactuated robotic manipulator 102 has five driven links 118 and five corresponding joints 120, in other embodiments, the first underactuated robotic manipulator may have two, three, four, six, seven, eight, nine, ten, twelve, or more driven links 118 and corresponding joints 120.

As illustrated in FIG. 2, the first underactuated robotic manipulator 102 also includes a plurality of connecting links 122, where each of the connecting links 122 is coupled to, and extends outwardly away from, a central portion of a respective one of the driven links 118. In more detail, the first underactuated robotic manipulator 102 includes a first, proximal connecting link 122a that is rotatably coupled to the first, proximal driven link 118a at a first, proximal rotatable joint 132a at a central portion thereof midway between the connection of the first proximal driven link 118a to the base frame 106 and the connection of the first proximal driven link 118a to the second driven link 118b. The first underactuated robotic manipulator 102 also includes a second connecting link 122b that is rotatably coupled to the second driven link 118b at a second rotatable joint 132b at a central portion thereof midway between the connection of the second driven link 118b to the first, proximal driven link 118a and the connection of the second driven link 118b to the third driven link 118c. The first underactuated robotic manipulator 102 also includes a third connecting link 122c that is rotatably coupled to the third driven link 118c at a third rotatable joint 132c at a central portion thereof midway between the connection of the third driven link 118c to the second driven link 118b and the connection of the third driven link 118c to the fourth driven link 118d. The first underactuated robotic manipulator 102 also includes a fourth connecting link 122d that is rotatably coupled to the fourth driven link 118d at a fourth rotatable joint 132d at a central portion thereof midway between the connection of the fourth driven link 118d to the third driven link 118c and the connection of the fourth driven link 118d to the fifth driven link 118e. The first underactuated robotic manipulator 102 also includes a fifth connecting link 122e that is rigidly coupled to the fifth driven link 118e at a central portion thereof midway between the connection of the fifth driven link 118e to the fourth driven link 118d and the terminal distal end of the fifth driven link 118e.

As illustrated in FIG. 2, the first underactuated robotic manipulator 102 also includes a driving lever arm 124 that is rotatably coupled to the base frame 106, the first and second support plates 110a, 110b thereof, and the first actuator 114 at a rotatable joint 126, such that the first actuator 114 can drive rotation of the driving lever arm 124 about the rotatable joint 126. The first underactuated robotic manipulator 102 also includes a plurality of driving links 128 that collectively form an outer side of the underactuated robotic manipulator 102. As used herein, the terminology "outer side" of the underactuated robotic manipulator 102 means the side of the underactuated robotic manipulator 102 opposite to the inner side thereof, which is typically a side of the underactuated robotic manipulator 102 away from which the underactuated robotic manipulator 102 bends as it is actuated and moves to contact the object.

In more detail, the first underactuated robotic manipulator 102 includes a first, proximal driving link 128a that is rotatably coupled at a first end thereof to the driving lever arm 124 at a first rotatable joint 130a and at a second end thereof to an outer end of the first, proximal connecting link 122a at a second rotatable joint 130b. The first underactuated robotic manipulator 102 also includes a second driving link 128b that is rotatably coupled at a first end thereof to an outer end of the first, proximal connecting link 122a at the second rotatable joint 130b and at a second end thereof to an outer end of the second connecting link 122b at a third rotatable joint 130c. The first underactuated robotic manipulator 102 also includes a third driving link 128c that is rotatably coupled at a first end thereof to an outer end of the second connecting link 122b at the third rotatable joint 130c and at a second end thereof to an outer end of the third connecting link 122c at a fourth rotatable joint 130d. The first underactuated robotic manipulator 102 also includes a fourth driving link 128d that is rotatably coupled at a first end thereof to an outer end of the third connecting link 122c at the fourth rotatable joint 130d and at a second end thereof to an outer end of the fourth connecting link 122d at a fifth rotatable joint 130e. The first underactuated robotic manipulator 102 also includes a fifth driving link 128e that is rotatably coupled at a first end thereof to an outer end of the fourth connecting link 122d at the fifth rotatable joint 130e and at a second end thereof to an outer end of the fifth connecting link 122e at a sixth rotatable joint 130f.

When the robotic system 100 is in operation and the first actuator 114 is operated to actuate movement of the first underactuated robotic manipulator 102, the first actuator 114 directly drives rotation of the driving lever arm 124 about the rotatable joint 126, such that the driving lever arm moves toward an object to be grasped or held, or in a clockwise direction about the rotatable joint 126 when viewed as in FIG. 2. Such motion of the driving lever arm 124 forces the first, proximal driving link 128a to move toward the object to be held, or in a clockwise direction about the rotatable joint 126 when viewed as in FIG. 2. Such motion of the first, proximal driving link 128a forces the first, proximal connecting link 122a to move toward the object to be held, or in a clockwise direction about the rotatable joint 126 and about the first rotatable joint 120a when viewed as in FIG. 2. Such motion of the first, proximal connecting link 122a forces the first, proximal driven link 118a to move toward the object to be held, or in a clockwise direction about the first rotatable joint 120a when viewed as in FIG. 2. Once the first, proximal driven link 118a comes into contact with the object to be held, or reaches the end of its range of motion, any continued motion of the first, proximal connecting link 122a forces the second driving link 128b to move distally.

Such motion of the second driving link 128b forces the second connecting link 122b to move toward the object to be held, or in a clockwise direction about the rotatable joint 126 and about the first rotatable joint 120a when viewed as in FIG. 2. Such motion of the second connecting link 122b forces the second driven link 118b to move toward the object to be held, or in a clockwise direction about the second rotatable joint 120b when viewed as in FIG. 2. Once the second driven link 118b comes into contact with the object to be held, or reaches the end of its range of motion, any continued motion of the second connecting link 122b forces the third driving link 128c to move distally. Such motion of the third driving link 128c forces the third connecting link 122c to move toward the object to be held, or in a clockwise direction about the rotatable joint 126 and about the first rotatable joint 120a when viewed as in FIG. 2. Such motion of the third connecting link 122c forces the third driven link 118c to move toward the object to be held, or in a clockwise direction about the third rotatable joint 120c when viewed as in FIG. 2. Once the third driven link 118c comes into contact with the object to be held, or reaches the end of its range of motion, any continued motion of the third connecting link 122c forces the fourth driving link 128d to move distally. Such motion of the fourth driving link 128d forces the fourth connecting link 122d to move toward the object to be held, or in a clockwise direction about the rotatable joint 126 and about the first rotatable joint 120a when viewed as in FIG. 2. Such motion of the fourth connecting link 122d forces the fourth driven link 118d to move toward the object to be held, or in a clockwise direction about the fourth rotatable joint 120d when viewed as in FIG. 2. Once the fourth driven link 118d comes into contact with the object to be held, or reaches the end of its range of motion, any continued motion of the fourth connecting link 122d forces the fifth driving link 128e to move distally. Such motion of the fifth driving link 128e forces the fifth connecting link 122e to move toward the object to be held, or in a clockwise direction about the rotatable joint 126 and about the first rotatable joint 120a when viewed as in FIG. 2. Such motion of the fifth connecting link 122e forces the fifth driven link 118e to move toward the object to be held, or in a clockwise direction about the fifth rotatable joint 120e when viewed as in FIG. 2. Once the fifth driven link 118e comes into contact with the object to be held, or reaches the end of its range of motion, any continued motion of the fifth connecting link 122e is stopped.

Thus, as described herein, the first underactuated robotic manipulator 102 can have a plurality of rotatable links (e.g., five rotatable links) coupled to one another and to the base frame 106 at a plurality of rotatable joints (e.g., five rotatable joints), and a single actuator 114. In operation, the single actuator 114 can drive operation of the underactuated robotic manipulator 102 to approach, contact, and progressively envelop an object to be grasped or held. Rotation of the links with respect to one another at the joints may be passively controlled by the continuous actuation of the underactuated robotic manipulator 102 by the actuator 114 and the links coming into contact with the object, such as at locations that may be referred to as "touch points."

As illustrated in FIG. 2, rotation of the components of the first underactuated robotic manipulator 102 with respect to one another at the first, second, third, fourth, and fifth rotatable joints 120, at the first, second, third, fourth, fifth, and sixth rotatable joints 130, and at the first, second, third, and fourth rotatable joints 132 occurs about a respective axis of rotation that is parallel to the axis of rotation generated by the first actuator 114 at the rotatable joint 126. As illustrated in FIG. 2, the first underactuated robotic manipulator 102 is coupled to the base frame 106 and extends laterally outward from the base frame 106 along a first longitudinal axis that is perpendicular to the axes of the rotation of the components at the rotatable joints 120, 130, and 132 and that extends through the first rotatable joint 120a. As also illustrated in FIG. 2, the rotatable joint 126 is offset from the first longitudinal axis and located outward from the first rotatable joint 120a with respect to the first longitudinal axis. As also illustrated in FIG. 2, the second underactuated robotic manipulator 104 is mounted to the base frame 106 adjacent to the first underactuated robotic manipulator 102 and such that it extends laterally outward from the base frame 106 along a second longitudinal axis that is perpendicular to the axes of the rotation of the components at the rotatable joints 120, 130, and 132 and that is parallel to the first longitudinal axis.

As illustrated in FIG. 2, the second underactuated robotic manipulator 104 has a structure that is the same as that of the first underactuated robotic manipulator 102, and functions in the same way as the first underactuated robotic manipulator 102, except that the second underactuated robotic manipulator 104 is arranged as a mirror image of the first underactuated robotic manipulator 102 about a plane that extends parallel to the first and second longitudinal axes of the first and second underactuated robotic manipulators 102, 104, as well as parallel to the axes of the rotation of the components at the rotatable joints 120, 130, and 132. Thus, an inner side of the second underactuated robotic manipulator 104 faces toward the inner side of the first underactuated robotic manipulator 102 and the inner side of the first underactuated robotic manipulator 102 faces toward the inner side of the second underactuated robotic manipulator 104. Thus, when the first actuator 114 is used to actuate movement of the first underactuated robotic manipulator 102 and the second actuator 116 is used to actuate movement of the second underactuated robotic manipulator 104, the robotic manipulators 102, 104 are driven to move toward one another until their inner sides contact an object to be held such that the object may be grasped or held between the first and second robotic manipulators 102, 104 by the inner sides thereof.

Figure 5:
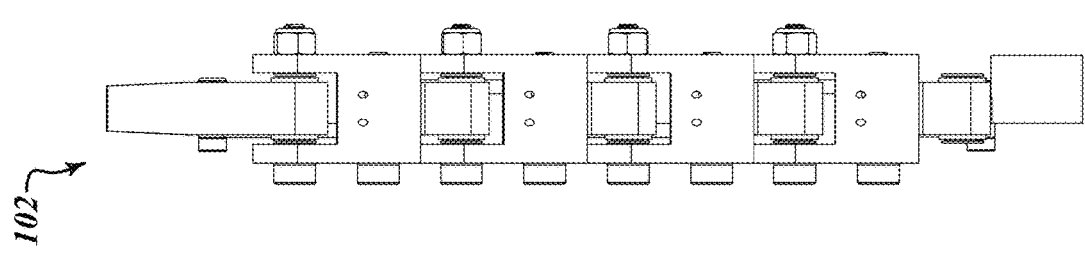
FIG. 5 illustrates a second, inner side view of the underactuated robotic manipulator of FIGS. 3 and 4 according to an embodiment of the present disclosure.
Figure 4:
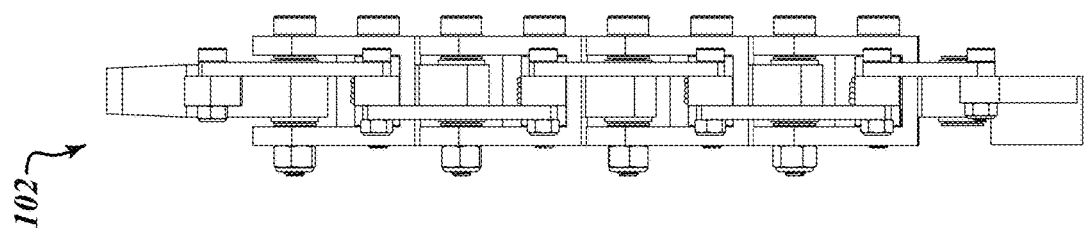
FIG. 4 illustrates a first, outer side view of the underactuated robotic manipulator of FIG. 3 according to an embodiment of the present disclosure.
Figure 3:
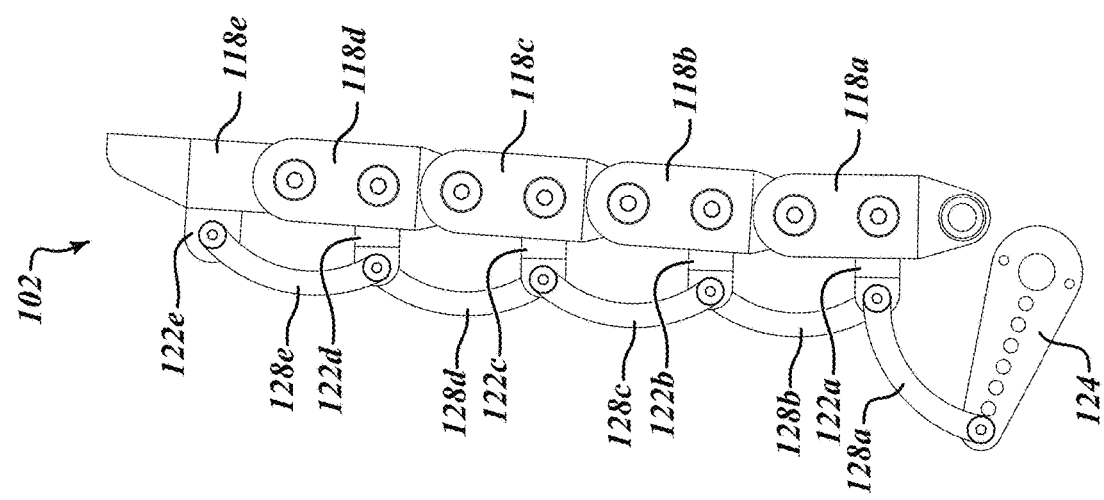
FIG. 3 illustrates a plan view of one of the underactuated robotic manipulators of FIG. 1 according to an embodiment of the present disclosure.

FIG. 3 illustrates a plan view of the first underactuated robotic manipulator 102. FIG. 4 illustrates an outer side view of the first underactuated robotic manipulator 102. FIG. 5 illustrates an inner side view of the first underactuated robotic manipulator 102. FIG. 6 illustrates one of the driving links 128 isolated from the rest of the robotic system 100 to more clearly illustrate features thereof. The driving links 128 may be identical to one another, and, as illustrated in FIG. 6, each driving link 128 may include a curved or an arcuate bar that extends from a first end thereof to a second end thereof opposite the first end along a curved path, wherein the first end includes a first bore hole 134 and the second end includes a second bore hole 136. The driving links 128 may be curved as illustrated in FIG. 6 to provide the underactuated robotic manipulator 102 with a given range of motion. For example, a driving link having a given overall length and a relatively large radius of curvature will have a relatively small range of motion and a driving link having the same given overall length and a relatively small radius of curvature will have a relatively large range of motion. In other embodiments, the driving links 128 may be V-shaped or trapezoidal instead of curved.

FIG. 7 illustrates one of the connecting links 122 isolated from the rest of the robotic system 100 to more clearly illustrate features thereof. The connecting links 122a, 122b, 122c, and 122d may be identical to one another, and, as illustrated in FIG. 7, each of the connecting links 122a, 122b, 122c, and 122d may include a first end including a projection that extends outward from a main body in a first direction and a second end including a pair of legs that extend outward from the main body parallel to one another and in a second direction opposite to the first direction. The projection has a first bore hole 138 and each of the legs has a respective second bore hole 140, where the two bore holes 140 extend along respective central longitudinal axes coincident with one another and parallel to a central longitudinal axis of the first bore hole 138.

When the first underactuated robotic manipulator 102 is assembled, the first end of one driving link 128 and the second end of another driving link 128 are positioned on opposite sides of the projection of each of the connecting links 122a, 122b, 122c, and 122d such that the central longitudinal axes of the first bore hole 134 of the one driving link 128 and the second bore hole 136 of the other one of the driving links 128 are coincident with the first bore hole 138 of the connecting link, and a single cylindrical rod extends through such bore holes to form a rotatable joint 130, as can be seen in additional detail in FIG. 4.

FIG. 8 illustrates one of the driven links 118 isolated from the rest of the robotic system 100 to more clearly illustrate features thereof. The driven links 118a, 118b, 118c, and 118d may be identical to one another, and, as illustrated in FIG. 8, each of the driven links 118a, 118b, 118c, and 118d may include a first end including a projection that extends outward from a main body in a first direction and a second end including a pair of legs that extend outward from the main body parallel to one another and in a second direction opposite to the first direction. The projection has a first bore hole 142 and each of the legs has a respective second bore hole 144, where the two bore holes 144 extend along respective central longitudinal axes coincident with one another and parallel to a central longitudinal axis of the first bore hole 142.

When the first underactuated robotic manipulator 102 is assembled, the projection at the first end of the first, proximal driven link 118 is positioned between the first and second support plates 110a, 110b such that the first bore hole 142 of the first, proximal driven link 118 is aligned with bore holes formed in the first and second support plates 110a, 110b, and a single rod extends through such bore holes to form the first rotatable joint 120a. The projections at the first ends of the second, third, and fourth driven links 118b, 118c, and 118d are positioned between the legs extending outward from the second ends of the first, second, and third driven links 118a, 118b, and 118c, respectively, such that the first bore holes 142 of the second, third, and fourth driven links 118b, 118c, and 118d are aligned with the second bore holes 144 of the first, second, and third driven links 118a, 118b, and 118c, respectively, and rods extends through such bore holes to form the second, third, and fourth rotatable joints 120b, 120c, and 120d, as can be seen in additional detail in FIG. 5.

As also illustrated in FIG. 8, each of the driven links 118a, 118b, 118c, and 118d also includes a central rod 146 that extends through a midpoint of the driven link 118, and a spring 148 mounted to the rod 146. When the first underactuated robotic manipulator 102 is assembled, the legs of each of the first, second, third, and fourth connecting links 122a, 122b, 122c, and 122d are positioned with their second bore holes 140 mounted on the rod 146 of the first, second, third, and fourth driven links 118a, 118b, 118c, and 118d, respectively, to form the first, second, third, and fourth rotatable joints 132a, 132b, 132c, and 132d, respectively. The spring 148 mounted on the rod 146 of each of the driven links 118a, 118b, 118c, and 118d is positioned and configured to bias the respective connecting link 122 to move away from an object to be held, or in a counter-clockwise direction about the rotatable joint 126 and about the first rotatable joint 120a when viewed as in FIG. 2. Thus, the springs 148 bias the first underactuated robotic manipulator 102 toward an open configuration. The spring forces provided by the springs can be high enough to force the first underactuated robotic manipulator 102 into an open position when not actuated by the first actuator 114, but low enough to be overcome by the first actuator 114 when the first actuator 114 operates.

FIG. 9 illustrates the fifth driven link 118e and the fifth connecting link 122e isolated from the rest of the robotic system 100 to more clearly illustrate features thereof, such as that the fifth driven link 118e and the fifth connecting link 122e may be formed integrally with, that is, as a single component with, one another. As illustrated in FIG. 9, the driven link 118e may include a first end including a projection that extends outward from a main body in a first direction and that has a bore hole 150. When the first underactuated robotic manipulator 102 is assembled, the projection at the first end of the fifth driven link 118e is positioned between the legs extending outward from the fourth driven link 118d such that the bore hole 150 of the fifth driven link 118e is aligned with the second bore holes 144 of the fourth driven link 118d and a rod extends through such bore holes to form the fifth rotatable joint 120e.

FIG. 9 also illustrates that the fifth connecting link 122e includes a first end including a projection that extends outward from a main body and that has a bore hole 152. When the first underactuated robotic manipulator 102 is assembled, the second end of the fifth driving link 128e is positioned on one side of the projection of the fifth connecting link 122e such that the central longitudinal axis of the second bore hole 136 of the fifth driving link 128e is coincident with the a central longitudinal axis of the bore hole 152 of the fifth connecting link 122e, and a single cylindrical rod extends through such bore holes to form the sixth rotatable joint 130f, as can be seen in additional detail in FIG. 4.

Figure 10:
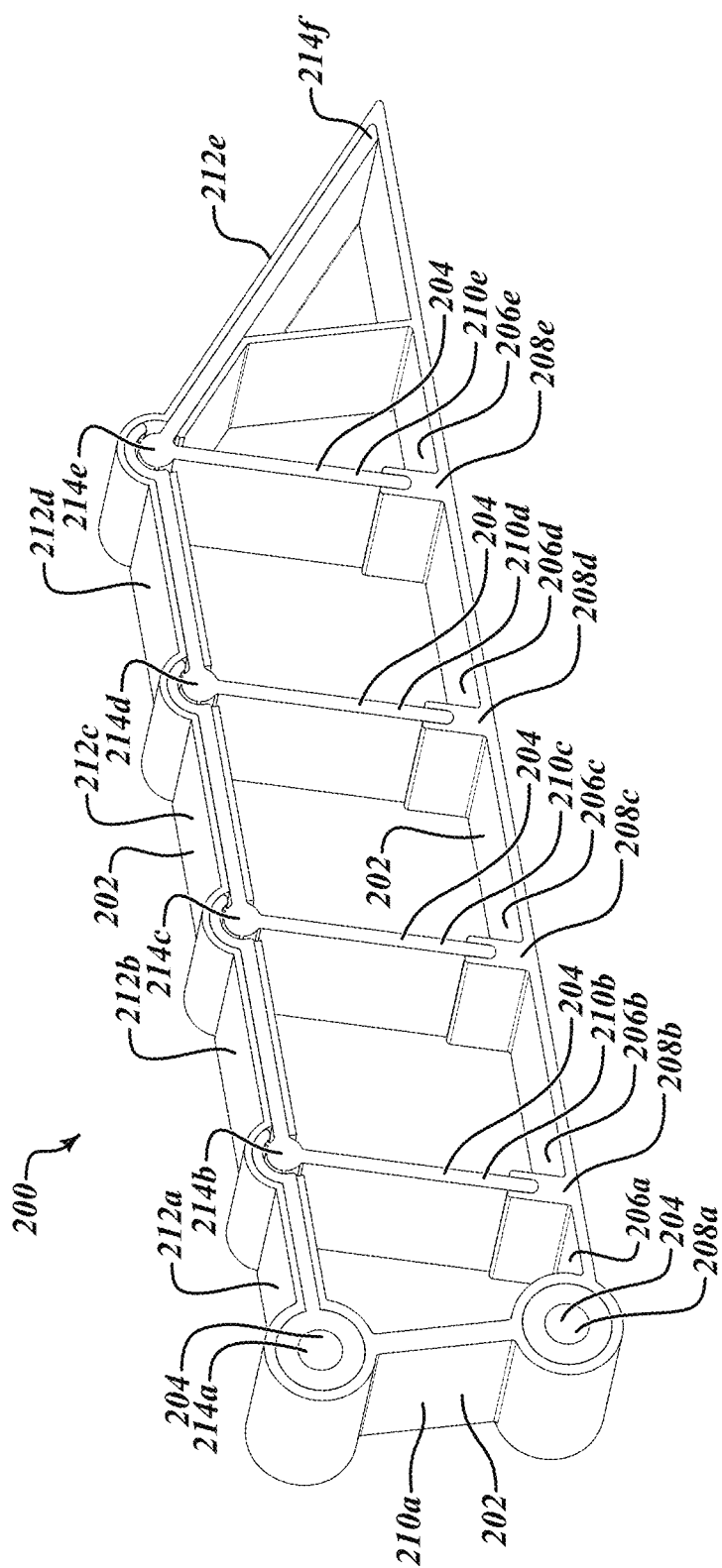
FIG. 10 illustrates a perspective view of another underactuated robotic manipulator according to an embodiment of the present disclosure.
Figure 11:
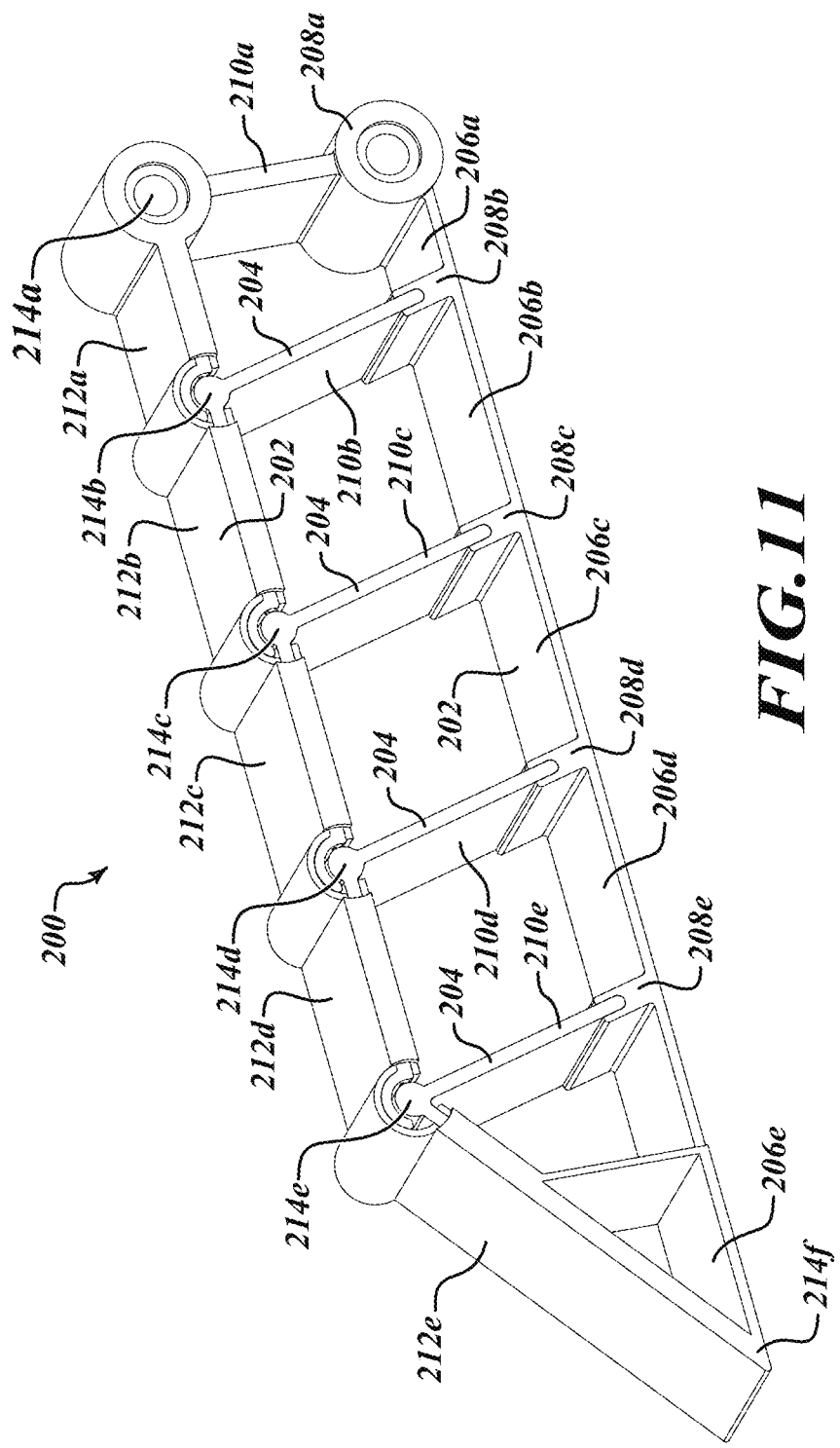
FIG. 11 illustrates another perspective view of the underactuated robotic manipulator of FIG. 10 according to an embodiment of the present disclosure.
Figure 12:
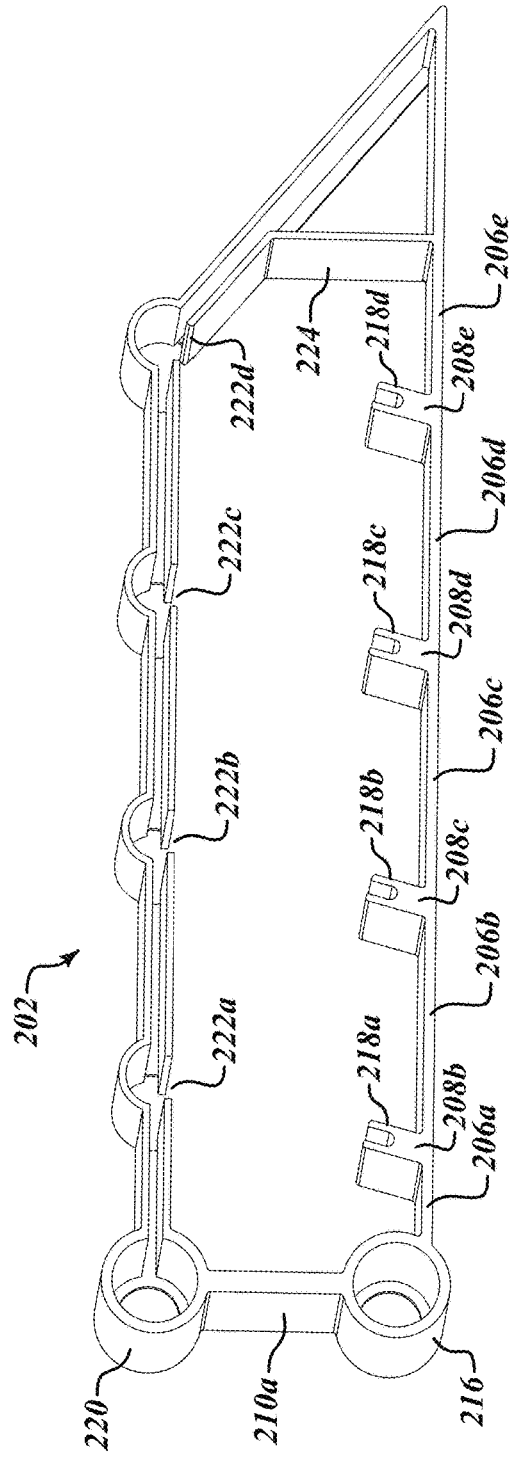
FIG. 12 illustrates a perspective view of a cover portion of the underactuated robotic manipulator of FIGS. 10 and 11 according to an embodiment of the present disclosure.
Figure 13:
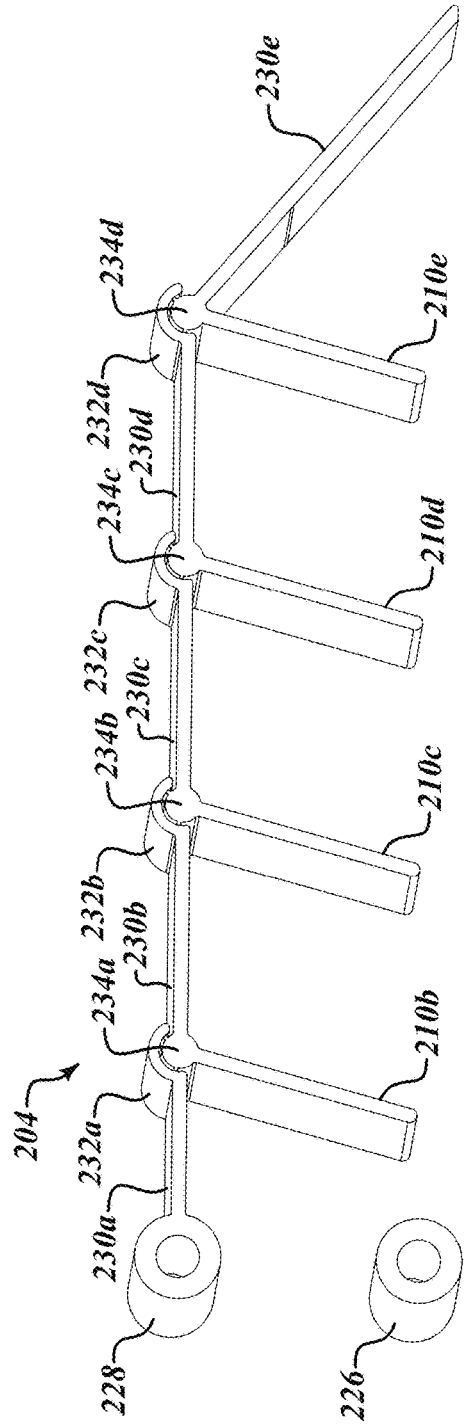
FIG. 13 illustrates a perspective view of a frame portion of the underactuated robotic manipulator of FIGS. 10 and 11 according to an embodiment of the present disclosure.

FIGS. 10 and 11 illustrate two different perspective views of another underactuated robotic manipulator 200. As illustrated in FIGS. 10 and 11, the underactuated robotic manipulator 200 includes a relatively flexible or pliable elastomeric outer shell or cover 202, which may be formed from a relatively flexible material, and a relatively rigid or stiff inner skeleton or framework of links 204, which may be formed from a relatively rigid material. FIG. 12 illustrates the cover 202 isolated from the rest of the underactuated robotic manipulator 200 to more clearly illustrate features thereof. FIG. 13 illustrates the framework of links 204 isolated from the rest of the underactuated robotic manipulator 200 to more clearly illustrate features thereof.

As used in the context of the underactuated robotic manipulator 200, "relatively flexible" means that the outer cover 202 and the material(s) it is made of are more flexible, or less rigid, than the framework of links 204, and "relatively rigid" means that the framework of links 204 and the material(s) it is made of are less flexible, or more rigid, than the outer cover 202. Thus, the term "relatively" is used in this context in the sense of "relative to" and does not imply any degree of uncertainty. The elastic modulus or modulus of elasticity of a relatively flexible material is lower than the elastic modulus or modulus of elasticity of a relatively rigid material.

In some embodiments, relatively flexible, elastomeric materials that can be used to form the outer cover 202 may include polyurethane plastics such as thermoplastic polyurethanes (TPUs) and elastomeric polyurethanes (EPUs), such as those commercially available from companies such as Carbon, Inc., of Redwood City, Calif., such as its "EPU 40" and "EPU 41" materials. In some embodiments, materials that can be used to form the outer cover 202 may include materials having relatively high coefficients of friction, such that the outer cover 202 may be used to more effectively grasp an object to be held by the underactuated robotic manipulator 200. In some embodiments, relatively rigid materials that can be used to form the framework of links 204 may include unfilled thermoplastics such as nylon or polypropylene, or rigid polyurethanes (RPUs), such as those commercially available from companies such as Carbon, Inc., such as its "RPU 130" material.

The underactuated robotic manipulator 200 has various similarities to, as well as various differences with respect to, the first and second underactuated robotic manipulators 102 and 104. The underactuated robotic manipulator 200 includes a plurality of driven links 206 that collectively form an inner side of the underactuated robotic manipulator 200. In more detail, the underactuated robotic manipulator 200 includes a single, solid, continuous, integral portion of the outer cover 202 that extends along the entire length of the inner side of the underactuated robotic manipulator 200. The single continuous portion of the outer cover 202 that extends along the inner side of the underactuated robotic manipulator 200 includes a first, proximal driven link 206a that is rotatably coupleable to a base frame at a first rotatable joint 208a, such that the entire inner side of the underactuated robotic manipulator 200 is rotatable about the first rotatable joint 208a. The underactuated robotic manipulator 200 also includes a second driven link 206b that is rotatably coupled to the first, proximal driven link 206a at a second rotatable joint 208b, such that the entire inner side of the underactuated robotic manipulator 200 distal to the first, proximal driven link 206a is rotatable about the second rotatable joint 208b. The underactuated robotic manipulator 200 also includes a third driven link 206c that is rotatably coupled to the second driven link 206b at a third rotatable joint 208c, such that the entire inner side of the underactuated robotic manipulator 200 distal to the second driven link 206b is rotatable about the third rotatable joint 208c. The underactuated robotic manipulator 200 also includes a fourth driven link 206d that is rotatably coupled to the third driven link 206c at a fourth rotatable joint 208d, such that the entire inner side of the underactuated robotic manipulator 200 distal to the third driven link 206c is rotatable about the fourth rotatable joint 208d. The underactuated robotic manipulator 200 also includes a fifth, distal driven link 206e that is rotatably coupled to the fourth driven link 206d at a fifth rotatable joint 208e, such that the fifth, distal driven link 206e is rotatable about the fifth rotatable joint 208e. While the underactuated robotic manipulator 200 has five driven links 206 and five corresponding joints 208, in other embodiments, the underactuated robotic manipulator may have two, three, four, six, seven, eight, nine, ten, twelve, or more driven links 206 and corresponding joints 208.

The underactuated robotic manipulator 200 also includes a plurality of connecting links 210, where each of the connecting links 210 is coupled to, and extends outwardly away from, a respective one of the joints 208. In more detail, the underactuated robotic manipulator 200 includes a first, proximal connecting link 210a that is rotatably coupled to the first rotatable joint 208a. The underactuated robotic manipulator 200 also includes a second connecting link 210b that is rotatably coupled to the second rotatable joint 208b. The underactuated robotic manipulator 200 also includes a third connecting link 210c that is rotatably coupled to the third rotatable joint 208c. The underactuated robotic manipulator 200 also includes a fourth connecting link 210d that is rotatably coupled to the fourth rotatable joint 208d. The underactuated robotic manipulator 200 also includes a fifth connecting link 210e that is rotatably coupled to the fifth rotatable joint 208e.

The underactuated robotic manipulator 200 also includes a plurality of driving links 212 that collectively form an outer side of the underactuated robotic manipulator 200. In more detail, the underactuated robotic manipulator 200 includes a first, proximal driving link 212a that may be rotatably coupled at a first, proximal end thereof to a driving lever arm, as well as to an outer end of the first connecting link 210a at a first rotatable joint 214a and at a second end thereof to an outer end of the second connecting link 210b at a second rotatable joint 214b. The underactuated robotic manipulator 200 also includes a second driving link 212b that is rigidly coupled at a first end thereof to an outer end of the second connecting link 210b at the second rotatable joint 214b and rotatably coupled at a second end thereof to an outer end of the third connecting link 210c at a third rotatable joint 214c. The underactuated robotic manipulator 200 also includes a third driving link 212c that is rigidly coupled at a first end thereof to an outer end of the third connecting link 210c at the third rotatable joint 214c and rotatably coupled at a second end thereof to an outer end of the fourth connecting link 210d at a fourth rotatable joint 214d. The underactuated robotic manipulator 200 also includes a fourth driving link 212d that is rigidly coupled at a first end thereof to an outer end of the fourth connecting link 210d at the fourth rotatable joint 214d and rotatably coupled at a second end thereof to an outer end of the fifth connecting link 210e at a fifth rotatable joint 214e. The underactuated robotic manipulator 200 also includes a fifth driving link 212e that is rigidly coupled at a first end thereof to an outer end of the fifth connecting link 210e at the fifth rotatable joint 214e and rotatably coupled at a second end thereof to a terminal distal end of the fifth driven link 206e at a sixth rotatable joint 214f.

As described herein, the underactuated robotic manipulator 200 includes a single, solid, continuous, integral portion of the outer cover 202 that extends along the entire length of the inner side of the underactuated robotic manipulator 200. The single continuous portion of the outer cover 202 that extends along the inner side of the underactuated robotic manipulator 200 includes the first, proximal driven link 206a, the second driven link 206b, the third driven link 206c, the fourth driven link 206d, and the fifth driven link 206e. As also described herein, the first, second, third, fourth, and fifth driven links 206a, 206b, 206c, 206d, and 206e are rotatable with respect to one another at the second, third, fourth, and fifth rotatable joints 208b, 208c, 208d, and 208e. In the context of the description of the underactuated robotic manipulator 200, the driven links 206 rotating with respect to one another as described herein may include the single continuous portion of the outer cover 202 that extends along the inner side of the underactuated robotic manipulator 200 bending at the joints 208.

As described herein, the second driving link 212b is rigidly coupled to the second connecting link 210b at the second rotatable joint 214b, the third driving link 212c is rigidly coupled to the third connecting link 210c at the third rotatable joint 214c, the fourth driving link 212d is rigidly coupled to the fourth connecting link 210d at the fourth rotatable joint 214d, and the fifth driving link 212e is rigidly coupled to the fifth connecting link 210e at the fifth rotatable joint 214e. In the context of the description of the underactuated robotic manipulator 200, the driving links 212 being rigidly coupled to the connecting links 210 as described herein may include each of the driving links 212 having a first portion made of a relatively rigid material and each of the connecting links 210 having a second portion made of a relatively rigid material that is integral with the first portion of the respective driving link 212.

When an actuator is operated to actuate movement of the underactuated robotic manipulator 200, such as in the manner described with respect to the robotic system 100, the actuator directly drives the first, proximal driving link 212a to move distally and/or toward the object to be held, or in a clockwise direction about the first rotatable joint 208a when viewed as in FIG. 10. Such motion of the first, proximal driving link 212a forces the second connecting link 210b to move toward the object to be held, or in a clockwise direction about the first rotatable joint 208a when viewed as in FIG. 10. Such motion of the second connecting link 210b forces the first driven link 206a to move toward the object to be held, or in a clockwise direction about the first rotatable joint 206a when viewed as in FIG. 10. Once the first, proximal driven link 206a comes into contact with the object to be held, or reaches the end of its range of motion, any continued motion of the first, proximal driving link 212a and/or second connecting link 210b forces the second driving link 212b to move distally and/or toward the object to be held, or in a clockwise direction about the first rotatable joint 208a when viewed as in FIG. 10.

Such motion of the second driving link 212b forces the third connecting link 210c to move toward the object to be held, or in a clockwise direction about the first rotatable joint 208a when viewed as in FIG. 10. Such motion of the third connecting link 210c forces the second driven link 206b to move toward the object to be held, or in a clockwise direction about the second rotatable joint 208b when viewed as in FIG. 10. Once the second driven link 206b comes into contact with the object to be held, or reaches the end of its range of motion, any continued motion of the second driving link 212b and/or third connecting link 210c forces the third driving link 212c to move distally and/or toward the object to be held, or in a clockwise direction about the first rotatable joint 208a when viewed as in FIG. 10. Such motion of the third driving link 212c forces the fourth connecting link 210d to move toward the object to be held, or in a clockwise direction about the first rotatable joint 208a when viewed as in FIG. 10. Such motion of the fourth connecting link 210d forces the third driven link 206c to move toward the object to be held, or in a clockwise direction about the third rotatable joint 208c when viewed as in FIG. 10. Once the third driven link 206c comes into contact with the object to be held, or reaches the end of its range of motion, any continued motion of the third driving link 212c and/or fourth connecting link 210d forces the fourth driving link 212d to move distally and/or toward the object to be held, or in a clockwise direction about the first rotatable joint 208a when viewed as in FIG. 10. Such motion of the fourth driving link 212d forces the fifth connecting link 210e to move toward the object to be held, or in a clockwise direction about the first rotatable joint 208a when viewed as in FIG. 10. Such motion of the fifth connecting link 210e forces the fourth driven link 206d to move toward the object to be held, or in a clockwise direction about the fourth rotatable joint 208d when viewed as in FIG. 10. Once the fourth driven link 206d comes into contact with the object to be held, or reaches the end of its range of motion, any continued motion of the fourth driving link 212d and/or fifth connecting link 210e forces the fifth driving link 212e to rotate toward the object to be held, or in a clockwise direction about the fifth rotatable joint 214e when viewed as in FIG. 10. Such motion of the fifth driving link 212e forces the fifth driven link 206e to move toward the object to be held, or in a clockwise direction about the fifth rotatable joint 208e when viewed as in FIG. 10. Once the fifth driven link 206e comes into contact with the object to be held, or reaches the end of its range of motion, any continued motion of the fifth driving link 212e is stopped.

Thus, as described herein, the underactuated robotic manipulator 200 can have a plurality of rotatable links (e.g., five rotatable links) coupled to one another and to a base frame at a plurality of rotatable joints (e.g., five rotatable joints), and a single actuator. In operation, the single actuator can drive operation of the underactuated robotic manipulator 200 to approach, contact, and progressively envelop an object to be grasped or held. Rotation of the links with respect to one another at the joints may be passively controlled by the continuous actuation of the underactuated robotic manipulator 200 by the actuator and the links coming into contact with the object, such as at locations that may be referred to as "touch points."

Once the underactuated robotic manipulator 200 has been actuated to grasp an object, inherent resilience of the cover 202 and the material from which it is formed is configured to bias the connecting links and joints of the underactuated robotic manipulator 200 to move away from the object, or in a counter-clockwise direction about the rotatable joint 208a when viewed as in FIG. 10. Thus, such resiliency biases the underactuated robotic manipulator 200 toward an open configuration. The resiliency provided by the cover 202 can be high enough to force the underactuated robotic manipulator 200 into an open position when not actuated by an actuator, but low enough to be overcome by the actuator when the actuator operates.

Rotation of the components of the underactuated robotic manipulator 200 with respect to one another at the first, second, third, fourth, and fifth rotatable joints 208, and at the first, second, third, fourth, fifth, and sixth rotatable joints 214 occurs about respective axes of rotation that are parallel to one another. The underactuated robotic manipulator 200 extends along a longitudinal axis that is perpendicular to the axes of the rotation of the components at the rotatable joints 208 and 214.

FIG. 12 illustrates a perspective view of the cover portion 202 of the underactuated robotic manipulator 200 without the framework of links 204 to more clearly illustrate features thereof. As illustrated in FIG. 12, the cover portion 202 includes a hollow cylindrical body 216 that forms a portion of the joint 208a illustrated in FIGS. 10 and 11 and that is configured to receive a corresponding cylindrical portion of the framework of links 204. As further illustrated in FIG. 12, the cover portion 202 also includes a first protrusion or connecting portion 218a, a second protrusion or connecting portion 218b, a third protrusion or connecting portion 218c, and a fourth protrusion or connecting portion 218d, where the connecting portions 218a, 218b, 218c, and 218d extend from the second, third, fourth, and fifth joints 208b, 208c, 208d, and 208e, respectively, inward into an interior of the cover 202. Each of the connecting portions 218a, 218b, 218c, and 218d includes a concavity, a socket, or a cup at a terminal, inner end thereof configured to receive a terminal end portion of a respective one of the second, third, fourth, and fifth connecting links 210b, 210c, 210d, and 210e.

As further illustrated in FIG. 12, the cover portion 202 also includes a hollow cylindrical body 220 that forms a portion of the rotatable joint 214a illustrated in FIGS. 10 and 11 and that is configured to receive a corresponding cylindrical portion of the framework of links 204. As further illustrated in FIG. 12, the cover portion 202 also includes an outer portion thereof that extends along an outer side of the underactuated robotic manipulator 200 opposite to the inner side thereof and that includes portions of the first, second, third, fourth, and fifth driving links 212a, 212b, 212c, 212d, and 212e that at least partially surround respective portions of the framework of links 204 to form the first, second, third, fourth, and fifth driving links 212a, 212b, 212c, 212d, and 212e. As further illustrated in FIG. 12, the cover portion 202 also includes a first opening or slot 222a, a second opening or slot 222b, a third opening or slot 222c, and a fourth opening or slot 222d, where the slots 222a, 222b, 222c, and 222d are formed in the outer portion of the cover 202 and configured to allow a portion of a respective one of the second, third, fourth, and fifth connecting links 210b, 210c, 210d, and 210e to pass into and out of the outer portion of the cover 202 from an interior of the outer portion of the cover 202 to an exterior of the outer portion of the cover 202.

As further illustrated in FIG. 12, the cover portion 202 also includes the first, proximal connecting link 210a, which extends from the hollow cylindrical body 216 to the hollow cylindrical body 220 and couples or locks the location of the rotatable joint 214a with respect to the joint 208a. In some embodiments, the underactuated robotic manipulator 200 and the cover 202 may not include the first, proximal connecting link 210a, for example, so that the location of the rotatable joint 214a can float more freely with respect to the joint 208a, which may further improve performance of the underactuated robotic manipulator 200 under some conditions. As further illustrated in FIG. 12, the cover portion 202 also includes a stabilizing member 224 that connects an inner flange of the outer portion of the cover 202 to the fifth, distal driven link 206e, such as to provide additional stability, such as out-of-plane stability, to the inner flange and to the fifth, distal driving link 206e.

In some embodiments, the entire cover 202 as described herein and illustrated in the Figures is formed of a single, solid, continuous, integral, and monolithic piece of material, or a piece of material that is formed in a single manufacturing step, such as a single casting or molding operation.

FIG. 13 illustrates a perspective view of the framework of links 204 of the underactuated robotic manipulator 200 without the cover 202 to more clearly illustrate features thereof. As illustrated in FIG. 13, the framework of links 204 includes a hollow cylindrical portion 226 configured to be seated within the hollow cylindrical body 216 of the cover 202 to provide rigidity thereto and to be mounted to a portion of a base frame.

As further illustrated in FIG. 13, the framework of links 204 also includes a hollow cylindrical portion 228 configured to be seated within the hollow cylindrical body 220 of the cover 202 to provide rigidity thereto and to be mounted to an actuator. As further illustrated in FIG. 13, the framework of links 204 also includes a first shaft 230a that forms a portion of the first, proximal driving link 212a and that is configured to be seated within the outer portion of the cover 202 to provide rigidity thereto and to the first, proximal driving link 212a. The first shaft 230a is rigidly coupled to and integrally formed with the hollow cylindrical portion 228 so that movement and rotation of the first rotatable joint 214a and hollow cylindrical portion 228 drives corresponding movement and rotation of the first, proximal driving link 212a. A terminal distal end of the first shaft 230a includes a first cup, concavity, or socket 232a that forms a portion of the second rotatable joint 214b.

As further illustrated in FIG. 13, the framework of links 204 also includes a first cylindrical portion 234a seated within the first socket 232a to form the second rotatable joint 214b. The first cylindrical portion 234a is rigidly coupled to and integrally formed with the second connecting link 210b. As further illustrated in FIG. 13, the framework of links 204 also includes a second shaft 230b that forms a portion of the second driving link 212b and that is configured to be seated within the outer portion of the cover 202 to provide rigidity thereto and to the second driving link 212b. The second shaft 230b is rigidly coupled to and integrally formed with the first cylindrical portion 234a, so that movement and rotation of the first socket 232a drives corresponding movement and rotation of the second connecting link 210b and the second driving link 212b. A terminal distal end of the second shaft 230b includes a second cup or socket 232b that forms a portion of the third rotatable joint 214c.

As further illustrated in FIG. 13, the framework of links 204 also includes a second cylindrical portion 234b seated within the second socket 232b to form the third rotatable joint 214c. The second cylindrical portion 234b is rigidly coupled to and integrally formed with the third connecting link 210c. As further illustrated in FIG. 13, the framework of links 204 also includes a third shaft 230c that forms a portion of the third driving link 212c and that is configured to be seated within the outer portion of the cover 202 to provide rigidity thereto and to the third driving link 212c. The third shaft 230c is rigidly coupled to and integrally formed with the second cylindrical portion 234b, so that movement and rotation of the second socket 232b drives corresponding movement and rotation of the third connecting link 210c and the third driving link 212c. A terminal distal end of the third shaft 230c includes a third cup or socket 232c that forms a portion of the fourth rotatable joint 214d.

As further illustrated in FIG. 13, the framework of links 204 also includes a third cylindrical portion 234c seated within the third socket 232c to form the fourth rotatable joint 214d. The third cylindrical portion 234c is rigidly coupled to and integrally formed with the fourth connecting link 210d. As further illustrated in FIG. 13, the framework of links 204 also includes a fourth shaft 230d that forms a portion of the fourth driving link 212d and that is configured to be seated within the outer portion of the cover 202 to provide rigidity thereto and to the fourth driving link 212d. The fourth shaft 230d is rigidly coupled to and integrally formed with the third cylindrical portion 234c, so that movement and rotation of the third socket 232c drives corresponding movement and rotation of the fourth connecting link 210d and the fourth driving link 212d. A terminal distal end of the fourth shaft 230d includes a fourth cup or socket 232d that forms a portion of the fifth rotatable joint 214e.

As further illustrated in FIG. 13, the framework of links 204 also includes a fourth cylindrical portion 234d seated within the fourth socket 232d to form the fifth rotatable joint 214e. The fourth cylindrical portion 234d is rigidly coupled to and integrally formed with the fifth connecting link 210e. As further illustrated in FIG. 13, the framework of links 204 also includes a fifth shaft 230e that forms a portion of the fifth driving link 212e and that is configured to be seated within the outer portion of the cover 202 to provide rigidity thereto and to the fifth driving link 212e. The fifth shaft 230e is rigidly coupled to and integrally formed with the fourth cylindrical portion 234d, so that movement and rotation of the fourth socket 232d drives corresponding movement and rotation of the fifth connecting link 210e and the fifth driving link 212e.

Figure 14:
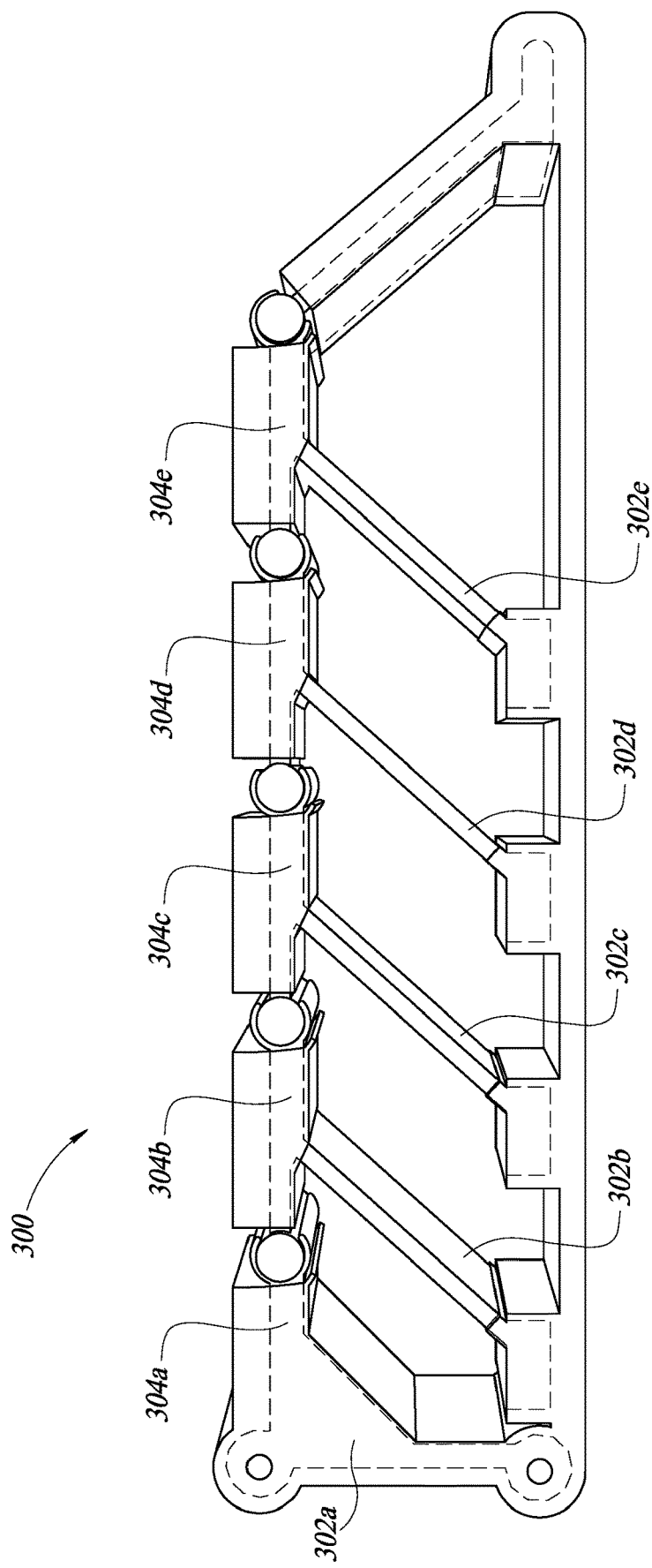
FIG. 14 is a photograph of another underactuated robotic manipulator according to an embodiment of the present disclosure.

FIG. 14 is a photograph of another underactuated robotic manipulator 300. The underactuated robotic manipulator 300 has the same mechanical structure, and functions in the same manner, as described herein for the underactuated robotic manipulator 200, except as follows. The underactuated robotic manipulator 300 includes a first connecting link 302a, a second connecting link 302b, a third connecting link 302c, a fourth connecting link 302d, and a fifth connecting link 302e that correspond to the first, second, third, fourth, and fifth connecting links 210a, 210b, 210c, 210d, and 210e, respectively, of the underactuated robotic manipulator 200. The underactuated robotic manipulator 300 also includes a first driving link 304a, a second driving link 304b, a third driving link 304c, a fourth driving link 304d, and a fifth driving link 304e that correspond to the first, second, third, fourth, and fifth driving links 212a, 212b, 212c, 212d, and 212e, respectively, of the underactuated robotic manipulator 200. As illustrated in FIG. 14, the outer terminal ends of the connecting links 302 are coupled to central portions of the respective driving links 304, rather than to rotatable joints or components thereof where the driving links 304 are coupled to one another.

The cover portion of the underactuated robotic manipulator 300, which corresponds to the cover portion 202 of the underactuated robotic manipulator 200, may be formed of any one of a number of suitable materials. In some embodiments, such materials may include relatively flexible, elastomeric materials, including urethane rubbers such as those commercially available from companies such as Smooth-On Inc. of Macungie, Pa., such as its "VytaFlex" and "VytaFlex 20" materials. The network of rigid links of the underactuated robotic manipulator 300, which corresponds to the network of links 204 of the underactuated robotic manipulator 200, may be formed of any one of a number of suitable materials. In some embodiments, such materials may include nylon mixed with chopped carbon fiber, such as related materials commercially available from companies such as Markforged, Inc. of Watertown, Mass., such as its "Onyx" and "Onyx One" materials.

Figure 15:
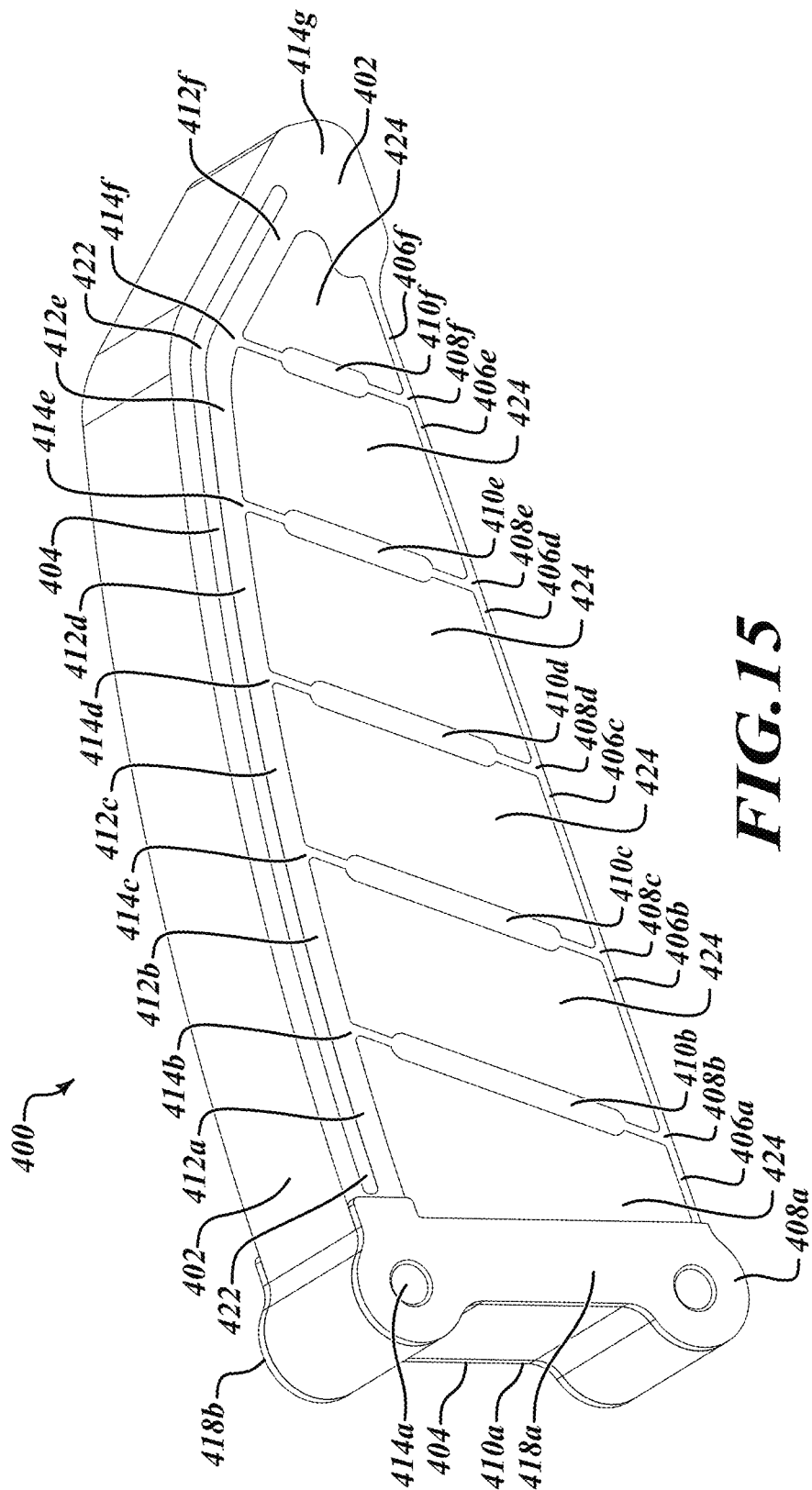
FIG. 15 illustrates a perspective view of another underactuated robotic manipulator according to an embodiment of the present disclosure.
Figure 16:
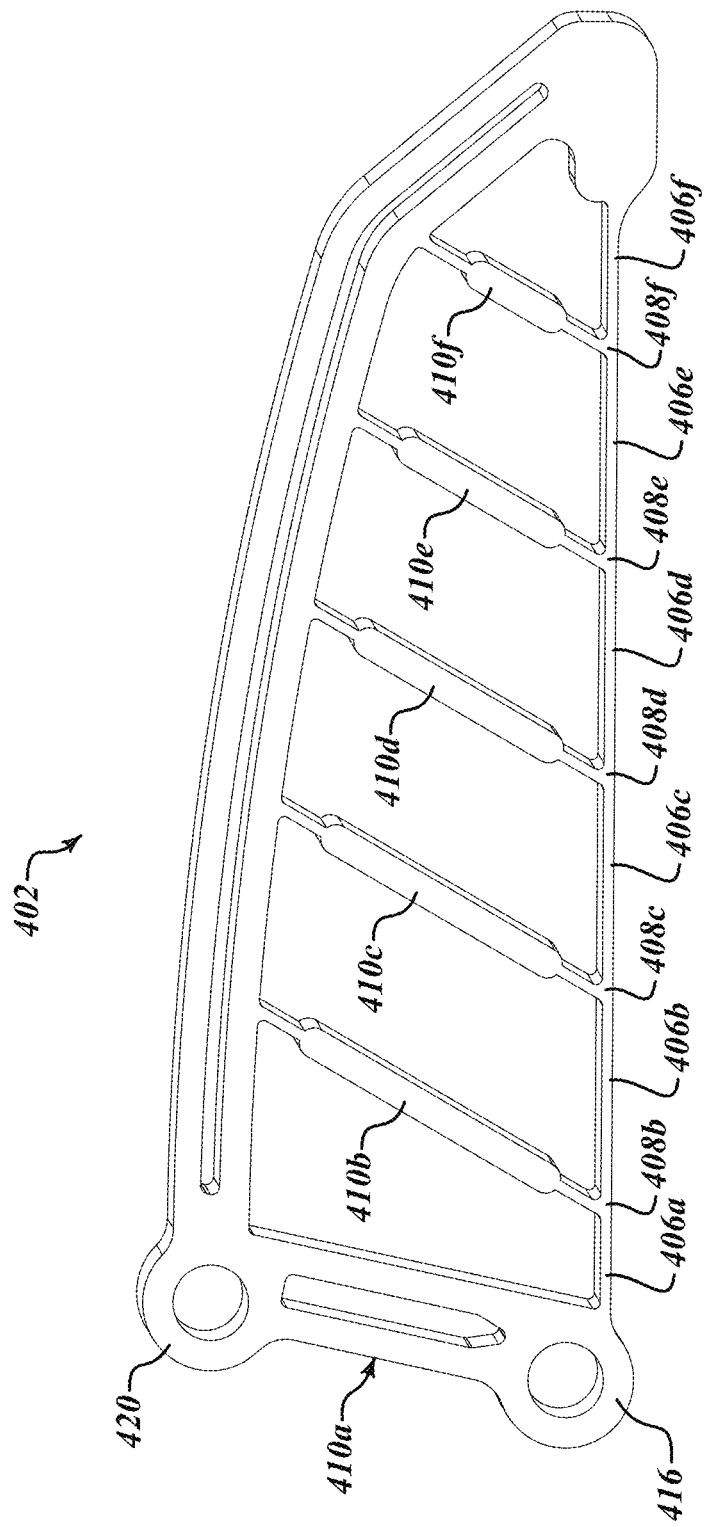
FIG. 16 illustrates a perspective view of a frame portion of the underactuated robotic manipulator of FIG. 15 according to an embodiment of the present disclosure.

FIG. 15 illustrates a perspective view of another underactuated robotic manipulator 400. As illustrated in FIG. 15, the underactuated robotic manipulator 400 includes a relatively flexible or pliable elastomeric outer shell or cover 402, which may be formed from a relatively flexible material, and a relatively rigid or stiff skeleton or set of links 404, which may be formed from a relatively rigid material. FIG. 16 illustrates the cover 402 isolated from the rest of the underactuated robotic manipulator 400 to more clearly illustrate features thereof.

As used in the context of the underactuated robotic manipulator 400, "relatively flexible" means that the outer cover 402 and the material(s) it is made of are more flexible, or less rigid, than the set of links 404, and "relatively rigid" means that the set of links 404 and the material(s) it is made of are less flexible, or more rigid, than the outer cover 402. Thus, the term "relatively" is used in this context in the sense of "relative to" and does not imply any degree of uncertainty. The elastic modulus or modulus of elasticity of a relatively flexible material is lower than the elastic modulus or modulus of elasticity of a relatively rigid material.

In some embodiments, relatively flexible, elastomeric materials that can be used to form the outer cover 402 may include polyurethane plastics such as thermoplastic polyurethanes (TPUs) and elastomeric polyurethanes (EPUs), such as those commercially available from companies such as Carbon, Inc., of Redwood City, Calif., such as its "EPU 40" and "EPU 41" materials. In some embodiments, relatively rigid materials that can be used to form the set of links 404 may include unfilled thermoplastics such as nylon or polypropylene, or rigid polyurethanes (RPUs), such as those commercially available from companies such as Carbon, Inc., such as its "RPU 130" material.

The underactuated robotic manipulator 400 has various similarities to, as well as various differences with respect to, the underactuated robotic manipulator 200. The underactuated robotic manipulator 400 includes a plurality of driven links 406 that collectively form an inner side of the underactuated robotic manipulator 400. In more detail, the underactuated robotic manipulator 400 includes a single, solid, continuous, integral portion of the outer cover 402 that extends along the entire length of the inner side of the underactuated robotic manipulator 400. The single continuous portion of the outer cover 402 that extends along the inner side of the underactuated robotic manipulator 400 includes a first, proximal driven link 406a that is rotatably coupleable to a base frame at a first rotatable joint 408a, such that the entire inner side of the underactuated robotic manipulator 400 is rotatable about the first rotatable joint 408a. The underactuated robotic manipulator 400 also includes a second driven link 406b that is rotatably coupled to the first, proximal driven link 406a at a second rotatable joint 408b, such that the entire inner side of the underactuated robotic manipulator 400 distal to the first, proximal driven link 406a is rotatable about the second rotatable joint 408b. The underactuated robotic manipulator 400 also includes a third driven link 406c that is rotatably coupled to the second driven link 406b at a third rotatable joint 408c, such that the entire inner side of the underactuated robotic manipulator 400 distal to the second driven link 406b is rotatable about the third rotatable joint 408c. The underactuated robotic manipulator 400 also includes a fourth driven link 406d that is rotatably coupled to the third driven link 406c at a fourth rotatable joint 408d, such that the entire inner side of the underactuated robotic manipulator 400 distal to the third driven link 406c is rotatable about the fourth rotatable joint 408d. The underactuated robotic manipulator 400 also includes a fifth driven link 406e that is rotatably coupled to the fourth driven link 406d at a fifth rotatable joint 408e, such that the entire inner side of the underactuated robotic manipulator 400 distal to the fourth driven link 406d is rotatable about the fifth rotatable joint 408e. The underactuated robotic manipulator 400 also includes a sixth, distal driven link 406f that is rotatably coupled to the fifth driven link 406e at a sixth rotatable joint 408f, such that the sixth, distal driven link 406f is rotatable about the sixth rotatable joint 408f. While the underactuated robotic manipulator 400 has six driven links 406 and six corresponding joints 408, in other embodiments, the underactuated robotic manipulator may have two, three, four, five, seven, eight, nine, ten, twelve, or more driven links 406 and corresponding joints 408.

The underactuated robotic manipulator 400 also includes a plurality of connecting links 410, where each of the connecting links 410 is coupled to, and extends outwardly away from, a respective one of the joints 408. In more detail, the underactuated robotic manipulator 400 includes a first, proximal connecting link 410a that is rotatably coupled to the first rotatable joint 408a. The underactuated robotic manipulator 400 also includes a second connecting link 410b that is rotatably coupled to the second rotatable joint 408b. The underactuated robotic manipulator 400 also includes a third connecting link 410c that is rotatably coupled to the third rotatable joint 408c. The underactuated robotic manipulator 400 also includes a fourth connecting link 410d that is rotatably coupled to the fourth rotatable joint 408d. The underactuated robotic manipulator 400 also includes a fifth connecting link 410e that is rotatably coupled to the fifth rotatable joint 408e. The underactuated robotic manipulator 400 also includes a sixth connecting link 410f that is rotatably coupled to the sixth rotatable joint 408f.

The underactuated robotic manipulator 400 also includes a plurality of driving links 412 that collectively form an outer side of the underactuated robotic manipulator 400. In more detail, the underactuated robotic manipulator 400 includes a first, proximal driving link 412a that may be rotatably coupled at a first, proximal end thereof to a driving lever arm, as well as to an outer end of the first connecting link 410a at a first joint 414a and at a second end thereof to an outer end of the second connecting link 410b at a second joint 414b. The underactuated robotic manipulator 400 also includes a second driving link 412b that is rotatably coupled at a first end thereof to an outer end of the second connecting link 410b at the second joint 414b and rotatably coupled at a second end thereof to an outer end of the third connecting link 410c at a third joint 414c. The underactuated robotic manipulator 400 also includes a third driving link 412c that is rotatably coupled at a first end thereof to an outer end of the third connecting link 410c at the third joint 414c and rotatably coupled at a second end thereof to an outer end of the fourth connecting link 410d at a fourth joint 414d. The underactuated robotic manipulator 400 also includes a fourth driving link 412d that is rotatably coupled at a first end thereof to an outer end of the fourth connecting link 410d at the fourth joint 414d and rotatably coupled at a second end thereof to an outer end of the fifth connecting link 410e at a fifth joint 414e. The underactuated robotic manipulator 400 also includes a fifth driving link 412e that is rotatably coupled at a first end thereof to an outer end of the fifth connecting link 410e at the fifth joint 414e and rotatably coupled at a second end thereof to an outer end of the sixth connecting link 410f at a sixth joint 414f The underactuated robotic manipulator 400 also includes a sixth driving link 412f that is rotatably coupled at a first end thereof to an outer end of the sixth connecting link 410f at the sixth joint 414f and rotatably coupled at a second end thereof to a terminal distal end of the sixth driven link 406f at a seventh rotatable joint 214g.

The first, second, third, fourth, fifth, and sixth driven links 406a, 406b, 406c, 406d, 406e, and 406f are rotatable with respect to one another at the second, third, fourth, fifth, and sixth rotatable joints 408b, 408c, 408d, 408e, and 408f, and the first, second, third, fourth, fifth, and sixth connecting links 410a, 410b, 410c, 410d, 410e, and 410f are rotatable with respect to the first, second, third, fourth, fifth, and sixth driven links 406a, 406b, 406c, 406d, 406e, and 406f at the first, second, third, fourth, fifth, and sixth rotatable joints 408a, 408b, 408c, 408d, 408e, and 408f, and with respect to the first, second, third, fourth, fifth, and sixth driving links 412a, 412b, 412c, 412d, 412e, and 412f at the first, second, third, fourth, fifth, and sixth joints 414a, 414b, 414c, 414d, 414e, and 414f. In the context of the description of the underactuated robotic manipulator 400, such components rotating with respect to one another as described herein may include the outer cover 402 bending at the respective joints.

The first and second driving links 412a and 412b are rigidly coupled to one another at the second joint 414b, the second and third driving links 412b and 412c are rigidly coupled to one another at the third joint 414c, the third and fourth driving links 412c and 412d are rigidly coupled to one another at the fourth joint 414d, the fourth and fifth driving links 412d and 412e are rigidly coupled to one another at the fifth joint 414e, and the fifth and sixth driving links 412e and 412f are rigidly coupled to one another at the sixth joint 414f. In the context of the description of the underactuated robotic manipulator 400, the driving links 412 being rigidly coupled to one another as described herein may include each of the driving links 412 including a respective portion of a single piece of relatively rigid material that extends through all of the driving links 412.

When an actuator is operated to actuate movement of the underactuated robotic manipulator 400, such as in the manner described with respect to the robotic system 100, the actuator directly drives the first, proximal driving link 412a to move distally and/or toward the object to be held, or in a clockwise direction about the first rotatable joint 408a when viewed as in FIG. 15. Such motion of the first, proximal driving link 412a forces the second connecting link 410b to move toward the object to be held, or in a clockwise direction about the first rotatable joint 408a when viewed as in FIG. 15. Such motion of the second connecting link 410b forces the first driven link 406a to move toward the object to be held, or in a clockwise direction about the first rotatable joint 406a when viewed as in FIG. 15. Once the first, proximal driven link 406a comes into contact with the object to be held, or reaches the end of its range of motion, any continued motion of the first, proximal driven link 406a is stopped and any continued motion of the first, proximal driving link 412a forces the second driving link 412b to move distally and/or toward the object to be held, or in a clockwise direction about the first rotatable joint 408a when viewed as in FIG. 15.

Such motion of the second driving link 412b forces the third connecting link 410c to move toward the object to be held, or in a clockwise direction about the first rotatable joint 408a when viewed as in FIG. 15. Such motion of the third connecting link 410c forces the second driven link 406b to move toward the object to be held, or in a clockwise direction about the second rotatable joint 408b when viewed as in FIG. 15. Once the second driven link 406b comes into contact with the object to be held, or reaches the end of its range of motion, any continued motion of the second driven link 406b is stopped and any continued motion of the second driving link 412b forces the third driving link 412c to move distally and/or toward the object to be held, or in a clockwise direction about the first rotatable joint 408a when viewed as in FIG. 15. Such motion of the third driving link 412c forces the fourth connecting link 410d to move toward the object to be held, or in a clockwise direction about the first rotatable joint 408a when viewed as in FIG. 15. Such motion of the fourth connecting link 410d forces the third driven link 406c to move toward the object to be held, or in a clockwise direction about the third rotatable joint 408c when viewed as in FIG. 15. Once the third driven link 406c comes into contact with the object to be held, or reaches the end of its range of motion, any continued motion of the third driven link 406c is stopped and any continued motion of the third driving link 412c forces the fourth driving link 412d to move distally and/or toward the object to be held, or in a clockwise direction about the first rotatable joint 408a when viewed as in FIG. 15. Such motion of the fourth driving link 412d forces the fifth connecting link 410e to move toward the object to be held, or in a clockwise direction about the first rotatable joint 408a when viewed as in FIG. 15. Such motion of the fifth connecting link 410e forces the fourth driven link 406d to move toward the object to be held, or in a clockwise direction about the fourth rotatable joint 408d when viewed as in FIG. 15. Once the fourth driven link 406d comes into contact with the object to be held, or reaches the end of its range of motion, any continued motion of the fourth driven link 406d is stopped and any continued motion of the fourth driving link 412d forces the fifth driving link 412e to move distally and/or toward the object to be held, or in a clockwise direction about the first rotatable joint 408a when viewed as in FIG. 15. Such motion of the fifth driving link 412e forces the sixth connecting link 410f to move toward the object to be held, or in a clockwise direction about the first rotatable joint 408a when viewed as in FIG. 15. Such motion of the sixth connecting link 410f forces the fifth driven link 406e to move toward the object to be held, or in a clockwise direction about the fifth rotatable joint 408e when viewed as in FIG. 15. Once the fifth driven link 406e comes into contact with the object to be held, or reaches the end of its range of motion, any continued motion of the fifth driven link 406e is stopped and any continued motion of the fifth driving link 412e forces the sixth driving link 412f to rotate toward the object to be held, or in a clockwise direction about the first rotatable joint 408a when viewed as in FIG. 15. Such motion of the sixth driving link 412f forces the sixth driven link 406f to move toward the object to be held, or in a clockwise direction about the sixth rotatable joint 408f when viewed as in FIG. 15. Once the sixth driven link 406f comes into contact with the object to be held, or reaches the end of its range of motion, any continued motion of the sixth driven link 406f and of the sixth driving link 412f is stopped.

Thus, as described herein, the underactuated robotic manipulator 400 can have a plurality of rotatable links (e.g., six rotatable links) coupled to one another and to a base frame at a plurality of rotatable joints (e.g., six rotatable joints), and a single actuator. In operation, the single actuator can drive operation of the underactuated robotic manipulator 400 to approach, contact, and progressively envelop an object to be grasped or held. Rotation of the links with respect to one another at the joints may be passively controlled by the continuous actuation of the underactuated robotic manipulator 400 by the actuator and the links coming into contact with the object, such as at locations that may be referred to as "touch points."

Once the underactuated robotic manipulator 400 has been actuated to grasp an object, inherent resilience of the cover 402 and the material from which it is formed is configured to bias the connecting links and joints of the underactuated robotic manipulator 400 to move away from the object, or in a counter-clockwise direction about the rotatable joint 408a when viewed as in FIG. 15. Thus, such resiliency biases the underactuated robotic manipulator 400 toward an open configuration. The resiliency provided by the cover 402 can be high enough to force the underactuated robotic manipulator 400 into an open position when not actuated by an actuator, but low enough to be overcome by the actuator when the actuator operates.

Rotation of the components of the underactuated robotic manipulator 400 with respect to one another at the first, second, third, fourth, fifth, and sixth rotatable joints 408, and at the first, second, third, fourth, fifth, sixth, and seventh rotatable joints 414 occurs about respective axes of rotation that are parallel to one another. The underactuated robotic manipulator 400 extends along a longitudinal axis that is perpendicular to the axes of the rotation of the components at the rotatable joints 408 and 414.

FIG. 16 illustrates a perspective view of the cover portion 402 of the underactuated robotic manipulator 400 without the set of links 404 and other components to more clearly illustrate features thereof. As illustrated in FIG. 16, the cover portion 402 includes a hollow cylindrical body 416 that forms a portion of the joint 408a illustrated in FIG. 15 and that is configured to receive a corresponding cylindrical portion of the set of links 404. As further illustrated in FIG. 16, the cover portion 402 also includes a hollow cylindrical body 420 that forms a portion of the joint 414a illustrated in FIG. 15 and that is configured to receive a corresponding cylindrical portion of the set of links 404. As further illustrated in FIG. 16, the cover portion 402 also includes an outer portion thereof that extends along an outer side of the underactuated robotic manipulator 400 opposite to the inner side thereof and that includes portions of the first, second, third, fourth, fifth, and sixth driving links 412a, 412b, 412c, 412d, 412e, and 412f that at least partially surround respective portions of the set of links 404 to form the first, second, third, fourth, fifth, and sixth driving links 412a, 412b, 412c, 412d, 412e, and 412f.

As further illustrated in FIG. 16, the cover portion 402 also includes the first, proximal connecting link 410a, which extends from the hollow cylindrical body 416 to the hollow cylindrical body 420 and couples or locks the location of the joint 414a with respect to the joint 408a. In some embodiments, the underactuated robotic manipulator 400 and the cover 402 may not include the first, proximal connecting link 410a, for example, so that the location of the joint 414a can float more freely with respect to the joint 408a, which may further improve performance of the underactuated robotic manipulator 400 under some conditions. As further illustrated in FIG. 16, the cover portion 402 also includes the second, third, fourth, fifth, and sixth connecting links 410b, 410c, 410d, 410e, and 410f. As illustrated in FIGS. 15 and 16, each of the second, third, fourth, fifth, and sixth connecting links 410b, 410c, 410d, 410e, and 410f have a diameter that decreases or necks down as the connecting links 410b, 410c, 410d, 410e, and 410f approach the respective joints 408 and 414. As further illustrated in FIG. 16, the cover portion 402 also includes the first, proximal driven link 406a, as well as the second, third, fourth, fifth, and sixth driven links 406b, 406c, 406d, 406e, and 406f.

In some embodiments, the entire cover 402 as described herein and illustrated in the Figures is formed of a single, solid, continuous, integral, and monolithic piece of material, or a piece of material that is formed in a single manufacturing step, such as a single casting or molding operation.

FIG. 15 illustrates additional details of the set of links 404 and other components of the underactuated robotic manipulator 400. For example, FIG. 15 illustrates that the set of links 404 includes first and second reinforcing plates 418a and 418b that extend along opposite side surfaces of the first, proximal connecting link 410a, such as to reinforce the first, proximal connecting link 410a, to further couple or lock the location of the joint 414a with respect to the joint 408a. The first and second reinforcing plates 418a and 418b may also include respective hollow cylindrical portions configured to be seated within the hollow cylindrical body 416 of the cover 402 to provide rigidity thereto and to be mounted to a portion of a base frame, as well as respective hollow cylindrical portions configured to be seated within the hollow cylindrical body 420 of the cover 402 to provide rigidity thereto and to be mounted to an actuator.

As further illustrated in FIG. 15, the set of links 404 also includes a shaft 422 that forms a portion of each of the first, second, third, fourth, fifth, and sixth driving links 412a, 412b, 412c, 412d, 412e, and 412f, and that is configured to be seated within the outer portion of the cover 402 to provide rigidity thereto and to the first, second, third, fourth, fifth, and sixth driving link 412a, 412b, 412c, 412d, 412e, and 412f. The shaft 422 is formed of a single, solid, continuous, integral, and monolithic piece of material that extends along an entire outer side of the underactuated robotic manipulator 400.

Figure 17:
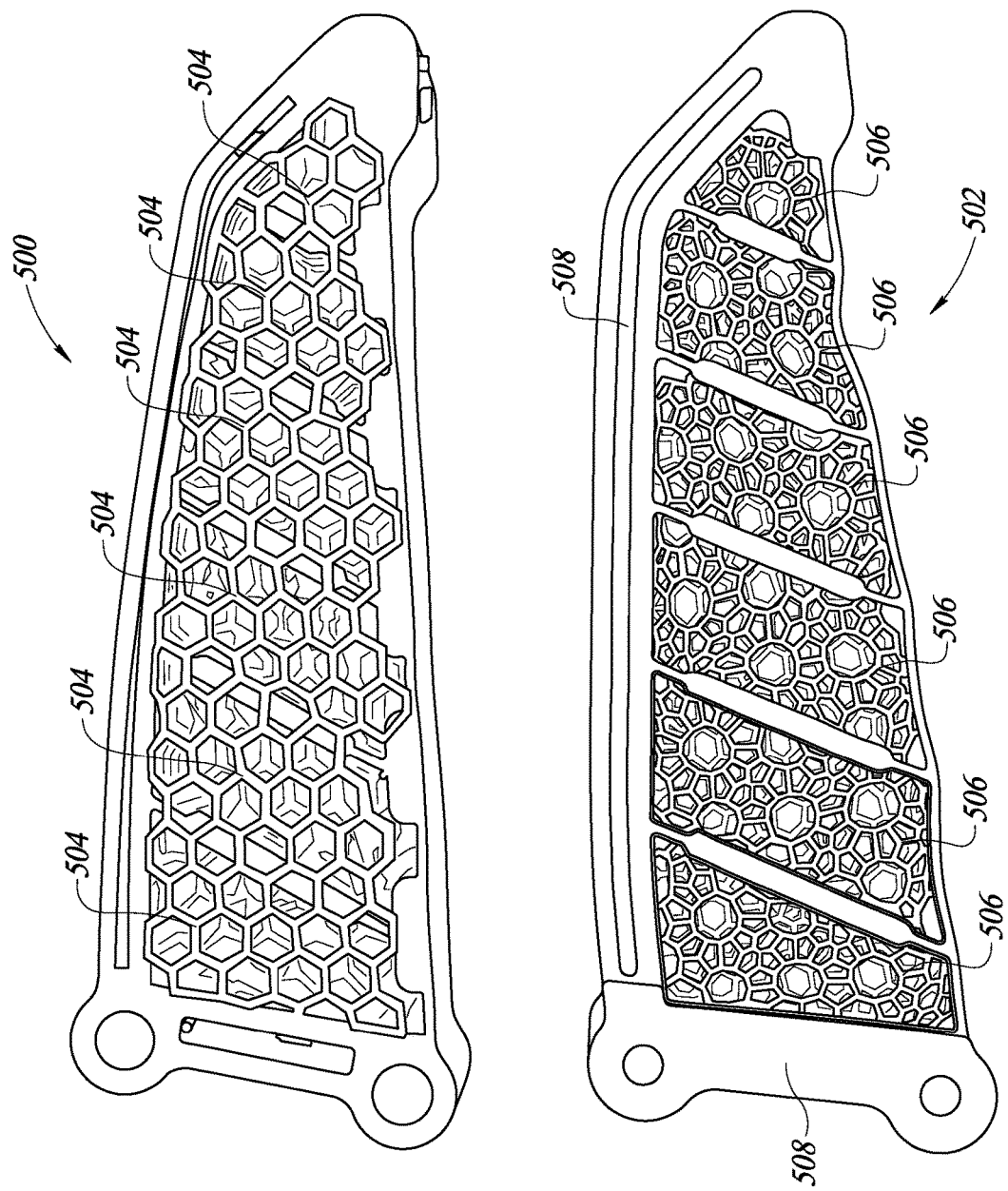
FIG. 17 is a photograph of latticework portions of underactuated robotic manipulators according to an embodiment of the present disclosure.

FIG. 15 also illustrates that the underactuated robotic manipulator 400 includes latticework portions 424 that extend between the driven links 406, the connecting links 410, and the driving links 412, such as to couple the links 406, 410, and 412 to one another, to provide the underactuated robotic manipulator 400 with a greater degree of rigidity, and to reduce buckling and out-of-plane bending of the underactuated robotic manipulator 400. In some embodiments, the latticework portions 424 may be formed of the same material(s) as the cover 402 and may include latticework as illustrated in FIG. 17. In some embodiments, the underactuated robotic manipulator 400 may be manufactured using a three-shot molding process, and/or with techniques made commercially available by companies such as Carbon, Inc., of Redwood City, Calif.

FIG. 17 illustrates a photograph of a first embodiment of a cover portion 500 and a second embodiment of a cover portion 502, where the cover portions 500 and 502 have various similarities to, as well as various differences with respect to, the cover portion 402 of the underactuated robotic manipulator 400. For example, the cover portion 500 has a structure that is similar to, and that performs in a manner that is similar to, that of the cover 402. The cover portion 500 includes a latticework portion 504 that extends across the gaps between the links of the cover portion 500. The cover portion 500, including such links and such latticework portion 504, may be formed of a single, solid, continuous, integral, and monolithic piece of material. As another example, the cover portion 502 has a structure that is similar to, and that performs in a manner that is similar to, that of the cover 402. The cover portion 502 includes a latticework portion 506 that extends across the gaps between the links of the cover portion 502. The cover portion 502, including such links and such latticework portion 506, may be formed of a single, solid, continuous, integral, and monolithic piece of material. The cover portion 502 is shown coupled to a set of links 508 that correspond to the set of links 404 described with respect to the underactuated robotic actuator 400. In some embodiments, increasing a density of the latticework portion of an underactuated robotic manipulator increases the rigidity of the underactuated robotic manipulator.

Figure 18:
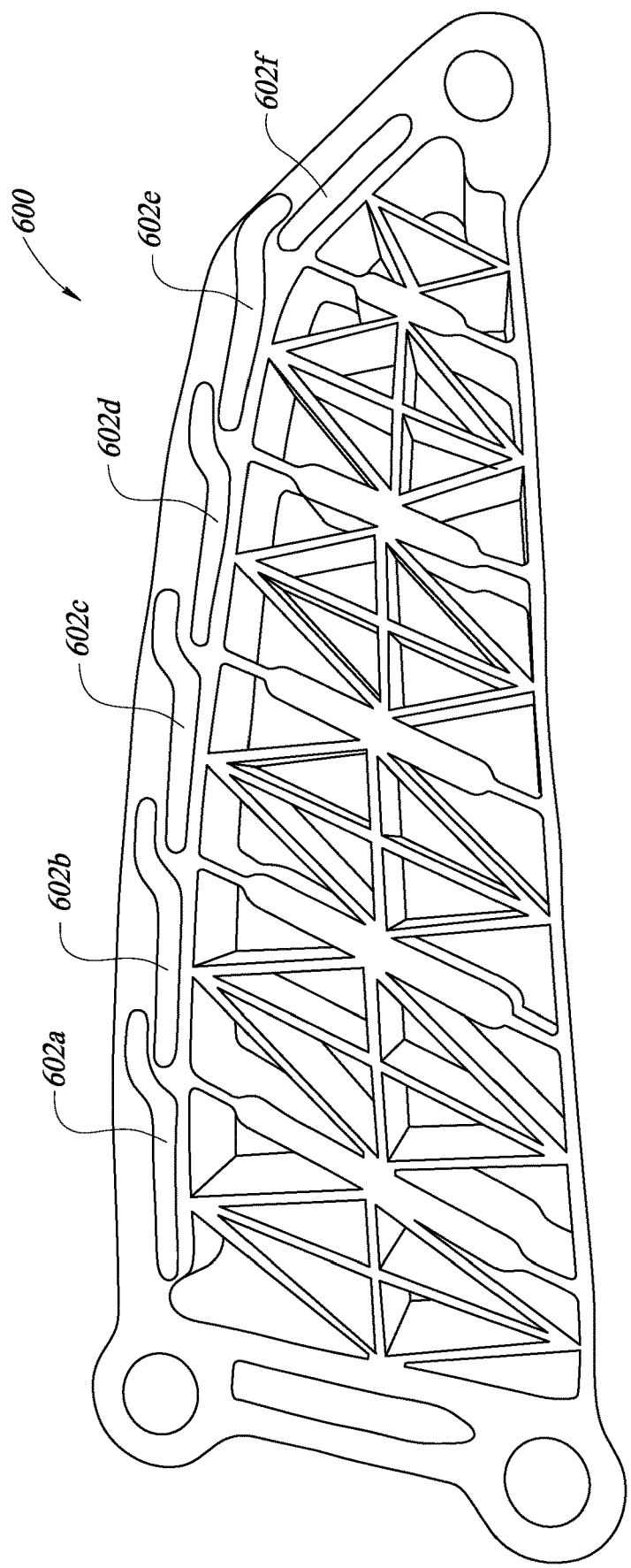
FIG. 18 is a photograph of another underactuated robotic manipulator according to an embodiment of the present disclosure.

FIG. 18 illustrates a photograph of portions of another underactuated robotic manipulator 600 that has various similarities to, as well as various differences with respect to, the underactuated robotic manipulator 400. For example, while the underactuated robotic manipulator 400 includes the shaft 422 that is formed of a single, solid, continuous, integral, and monolithic piece of material that extends along an entire outer side of the underactuated robotic manipulator 400 as described herein, the underactuated robotic manipulator 600 includes a plurality of smaller shafts 602a, 602b, 602c, 602d, 602e, and 602f that have features similar to the first, second, third, fourth, and fifth shafts 230a, 230b, 230c, 230d, and 230e of the underactuated robotic manipulator 200. For example, the shafts 602a, 602b, 602c, 602d, and 602e have a socket-shaped portion at a first end configured to cradle an opposing end of another one of the shafts 602, in a manner similar to that described herein with respect to the underactuated robotic manipulator 200.

In some embodiments, any of the driven links described herein or any of the touch points described herein of any of the underactuated robotic manipulators described herein may include vacuum suction ports, such that during use, suction may be applied to an object to be grasped to assist in grasping the object, and the suction may be removed to allow the underactuated robotic manipulators to release the object. In some embodiments, any of the underactuated robotic manipulators described herein may be used on a manufacturing or other assembly line. For example, the underactuated robotic manipulators described herein may be used inside of larger containers within an assembly line, and may be used to sort or otherwise manipulate items being manufactured. In some embodiments, any of the underactuated robotic manipulators described herein may be used in a warehouse such as a retail supply chain warehouse, where the objects to be grasped include apparel, consumer goods, other merchandise, and the like. The objects to be held by the underactuated robotic manipulators described herein may be any physical objects the manipulators are capable of holding, such as tools, parts, components, packages, letters, foodstuffs, etc.

An object identification process may allow any of the robotic manipulators described herein to adjust forces or pressures exerted by the touch points thereof based on identified size, dimensions, weight, shape, or other characteristics of the object(s) to be held. The robotic manipulators may also be controlled in part by machine learning, recursive learning, or artificial intelligence techniques. Over time, a system controlling the robotic manipulators described herein may be adjusted and optimized based on learned characteristics of object characteristics, pressure and sensor feedback, object drop rates, object grasp rates, finger slippage, etc. Feedback data may be analyzed over time to improve control of the manipulator(s) described herein based on predicted or anticipated actuation levels, which may correspond to forces or pressures to be exerted by the touch points of the manipulators described herein. In such embodiments, a learning engine may process data using various artificial intelligence techniques, such as, for example, recursive learning, fuzzy logic, deep learning, and the like.

In such embodiments, a computer, which is a machine, can perform one or more related tasks where a measure defines success. The computer may learn through exposure to information that represents one or more events. Based on the information that represents the one or more events and associated measure of success the computer may change processor-executable instructions associated with performing the one or more related tasks. If, after the change, the computer improves under the measure, then the computer has learned. Further, the computer learns (e.g., updates the processor-executable instructions) absent a human operator updating the processor-executable instructions (e.g., updates via imperative programming).

U.S. provisional patent application No. 62/771,917, filed Nov. 27, 2018, is hereby incorporated herein by reference in its entirety. The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. An underactuated robotic manipulator, comprising:
a first driven link rotatable about a first joint, wherein the first driven link includes a first touch point configured to contact an object to be held by the underactuated robotic manipulator, wherein the first driven link is rotatably coupled to a base frame;
a second driven link coupled to the first driven link and rotatable with respect to the first driven link about a second joint, wherein the second driven link includes a second touch point configured to contact the object to be held by the underactuated robotic manipulator;
a first connecting link coupled to the first driven link and rotatable with respect to the first driven link;
a second connecting link coupled to the second driven link and rotatable with respect to the second driven link;

a first driving link coupled to the first connecting link and rotatable with respect to the first connecting link about a third joint; and a second driving link having a first end coupled to the first connecting link and the first driving link at the third joint and a second end coupled to the second connecting link and rotatable with respect to the second connecting link about a fourth joint.

2. The underactuated robotic manipulator of claim 1 wherein the first driving link is rotatably coupled to an actuator.

3. The underactuated robotic manipulator of claim 1, further comprising latticework that extends from the second driving link to the second driven link and from the first connecting link to the second connecting link.

4. The underactuated robotic manipulator of claim 1 wherein the first connecting link is coupled to the first driven link at a fifth joint and rotatable with respect to the first driven link at the fifth joint.

5. The underactuated robotic manipulator of claim 4 wherein the fifth joint is located at a midpoint of the first driven link.

6. The underactuated robotic manipulator of claim 1 wherein the second connecting link is coupled to the second driven link at a fifth joint and rotatable with respect to the second driven link at the fifth joint.

7. The underactuated robotic manipulator of claim 6 wherein the fifth joint is located at a midpoint of the second driven link.

8. The underactuated robotic manipulator of claim 1 wherein the first end of the second driving link is rotatable with respect to the first connecting link and the first driving link at the third joint.

9. The underactuated robotic manipulator of claim 1 wherein the first connecting link is coupled to the first driven link at the second joint and is rotatable with respect to the first driven link about the second joint.

10. The underactuated robotic manipulator of claim 1 wherein the first end of the second driving link is rigidly coupled to the first connecting link at the third joint.

11. The underactuated robotic manipulator of claim 1 wherein the first end of the second driving link is rigidly coupled to the first driving link at the third joint.

12. An underactuated robotic manipulator, comprising:
a first driven link rotatable about a first joint, wherein the first driven link includes a first touch point configured to contact an object to be held by the underactuated robotic manipulator;
a second driven link coupled to the first driven link and rotatable with respect to the first driven link about a second joint, wherein the second driven link includes a second touch point configured to contact the object to be held by the underactuated robotic manipulator;
a first connecting link coupled to the first driven link and rotatable with respect to the first driven link;
a second connecting link coupled to the second driven link and rotatable with respect to the second driven link;
a first driving link coupled to the first connecting link and rotatable with respect to the first connecting link about a third joint;
a second driving link having a first end coupled to the first connecting link and the first driving link at the third joint and a second end coupled to the second connecting link and rotatable with respect to the second connecting link about a fourth joint;

a third driven link coupled to the second driven link and rotatable with respect to the second driven link about a fifth joint, wherein the third driven link includes a third touch point configured to contact the object to be held by the underactuated robotic manipulator;
a third connecting link coupled to the third driven link and rotatable with respect to the third driven link; and
a third driving link having a first end coupled to the second connecting link and the second driving link at the fourth joint and a second end coupled to the third connecting link and rotatable with respect to the third connecting link about a sixth joint.

13. The underactuated robotic manipulator of claim 12, further comprising:
a fourth driven link coupled to the third driven link and rotatable with respect to the third driven link about a seventh joint, wherein the fourth driven link includes a fourth touch point configured to contact the object to be held by the underactuated robotic manipulator;
a fourth connecting link coupled to the fourth driven link and rotatable with respect to the fourth driven link; and
a fourth driving link having a first end coupled to the third connecting link and the third driving link at the sixth joint and a second end coupled to the fourth connecting link and rotatable with respect to the fourth connecting link about an eighth joint.

14. An underactuated robotic manipulator, comprising:
a first driven link rotatable about a first joint, wherein the first driven link includes a first touch point configured to contact an object to be held by the underactuated robotic manipulator;
a second driven link coupled to the first driven link and rotatable with respect to the first driven link about a second joint, wherein the second driven link includes a second touch point configured to contact the object to be held by the underactuated robotic manipulator;
a first connecting link coupled to the first driven link and rotatable with respect to the first driven link;
a second connecting link coupled to the second driven link and rotatable with respect to the second driven link;
a first driving link coupled to the first connecting link and rotatable with respect to the first connecting link about a third joint;
a second driving link having a first end coupled to the first connecting link and the first driving link at the third joint and a second end coupled to the second connecting link and rotatable with respect to the second connecting link about a fourth joint;
a third driven link coupled to the second driven link and rotatable with respect to the second driven link about a fifth joint, wherein the third driven link includes a third touch point configured to contact the object to be held by the underactuated robotic manipulator;
a third connecting link coupled to the third driven link and rotatable with respect to the third driven link;
a third driving link having a first end coupled to the second connecting link and the second driving link at the fourth joint and a second end coupled to the third connecting link and rotatable with respect to the third connecting link about a sixth joint;
a fourth driven link coupled to the third driven link and rotatable with respect to the third driven link about a seventh joint, wherein the fourth driven link includes a fourth touch point configured to contact the object to be held by the underactuated robotic manipulator;

a fourth connecting link coupled to the fourth driven link and rotatable with respect to the fourth driven link;

a fourth driving link having a first end coupled to the third connecting link and the third driving link at the sixth joint and a second end coupled to the fourth connecting link and rotatable with respect to the fourth connecting link about an eighth joint;

a fifth driven link coupled to the fourth driven link and rotatable with respect to the fourth driven link about a ninth joint, wherein the fifth driven link includes a fifth touch point configured to contact the object to be held by the underactuated robotic manipulator; and a fifth driving link having a first end coupled to the fourth connecting link and the fourth driving link at the eighth joint.

15. The underactuated robotic manipulator of claim 14, further comprising:

a fifth connecting link rigidly coupled to the fifth driven link;

wherein the fifth driving link has a second end rotatably coupled to the fifth connecting link.

16. The underactuated robotic manipulator of claim 14 wherein the fifth driving link has a second end coupled to the fifth driven link at a tenth joint and rotatable with respect to the fifth driven link about the tenth joint.

17. The underactuated robotic manipulator of claim 14, further comprising:

a fifth connecting link coupled to the fifth driven link at a tenth joint and rotatable with respect to the fifth driven link about the tenth joint;

wherein the fifth driving link has a second end coupled to the fifth connecting link at an eleventh joint and rotatable with respect to the fifth connecting link about the eleventh joint.

18. The underactuated robotic manipulator of claim 17, further comprising:

a sixth driven link coupled to the fifth driven link and rotatable with respect to the fifth driven link about the tenth joint, wherein the sixth driven link includes a sixth touch point configured to contact the object to be held by the underactuated robotic manipulator; and a sixth driving link having a first end coupled to the fifth connecting link and the fifth driving link at the eleventh joint.

19. The underactuated robotic manipulator of claim 18 wherein the sixth driving link has a second end coupled to the sixth driven link at a twelfth joint and rotatable with respect to the sixth driven link about the twelfth joint.

* * * * *